United States Patent
White et al.

(10) Patent No.: US 6,835,131 B1
(45) Date of Patent: Dec. 28, 2004

(54) GAME APPARATUS FOR SUPPLYING POWER TO PLAYING ELEMENTS

(75) Inventors: Andrew David White, Berkshire (GB); Marc Adrian Borrett, Berkshire (GB); Glen Pitt-Pladdy, Berkshire (GB)

(73) Assignee: Innovision Research & Technology PLC, Berkshire (GB)

( * ) Notice: Subject to any disclaimer, the term of this patent is extended or adjusted under 35 U.S.C. 154(b) by 0 days.

(21) Appl. No.: 09/856,189

(22) PCT Filed: Nov. 26, 1999

(86) PCT No.: PCT/GB99/03948

§ 371 (c)(1),
(2), (4) Date: Aug. 16, 2001

(87) PCT Pub. No.: WO00/31676

PCT Pub. Date: Jun. 2, 2000

(30) Foreign Application Priority Data

Nov. 26, 1998 (GB) ............................................. 9825975

(51) Int. Cl.⁷ ................................................. A63F 9/24
(52) U.S. Cl. ........................... 463/1; 273/237; 273/238; 273/275
(58) Field of Search ....................... 463/1, 29; 273/237, 273/238, 275

(56) References Cited

U.S. PATENT DOCUMENTS

| | | | |
|---|---|---|---|
| 4,275,442 A | * | 6/1981 | Underwood et al. ............ 463/9 |
| 4,876,535 A | | 10/1989 | Ballmer et al. ......... 340/825.34 |
| 5,021,778 A | | 6/1991 | Walton ................... 340/825.54 |
| 5,190,285 A | * | 3/1993 | Levy et al. .................... 463/36 |
| 5,204,672 A | | 4/1993 | Brooks .................. 340/825.71 |
| 5,276,294 A | | 1/1994 | Jalbert |
| 5,347,263 A | | 9/1994 | Carroll et al. ............... 340/572 |
| 5,462,281 A | * | 10/1995 | Gaito et al. .................. 273/238 |
| 5,682,032 A | | 10/1997 | Philipp ........................ 235/422 |
| 5,730,165 A | | 3/1998 | Philipp ............................ 137/1 |
| 5,853,327 A | * | 12/1998 | Gilboa .......................... 463/39 |
| 5,883,582 A | | 3/1999 | Bowers et al. ......... 340/825.54 |
| 5,906,369 A | * | 5/1999 | Brennan et al. ............. 273/238 |
| 6,041,215 A | * | 3/2000 | Maddrell et al. ........... 434/317 |
| 6,102,397 A | * | 8/2000 | Lee et al. .................... 273/238 |

FOREIGN PATENT DOCUMENTS

| | | |
|---|---|---|
| EP | 0 702 323 A2 | 3/1996 |
| EP | 0 702 324 A2 | 3/1996 |
| GB | 2 308 481 | 6/1997 |
| WO | WO95/17051 | 6/1995 |
| WO | WO96/36134 | 11/1996 |
| WO | WO97/03739 | 2/1997 |
| WO | WO97/17667 | 5/1997 |
| WO | WO97/23060 | 6/1997 |
| WO | WO97/31325 | 8/1997 |

\* cited by examiner

*Primary Examiner*—John M. Hotaling, II
*Assistant Examiner*—Julie Brocketti
(74) *Attorney, Agent, or Firm*—Finnegan, Henderson, Farabow, Garrett & Dunner, L.L.P.

(57) ABSTRACT

A game module has a signal generator for generating a signal for supply to a playing piece when the playing piece is electrically coupled to the games module. The playing piece has a memory for storing data and is arranged to derive a power supply from the signal supplied by the game module by coupling to a user so as to complete an electrical path via the user back to the game module and to communicate data with the game module when power is thereby derived by the power deriving means from the signal provided by the game module.

37 Claims, 17 Drawing Sheets

GAME APPARATUS FOR SUPPLYING POWER TO PLAYING ELEMENTS

TECHNICAL FIELD

This invention relates to a games apparatus having a games module for supplying power to one or more playing pieces wherein data communication can occur between the games module and the playing piece(s).

BACKGROUND

WO97/23060 describes apparatus for bi-directional data and uni-directional power transmission between a games module and playing pieces. This apparatus uses RF inductive coupling to supply power from the games module to physically separate passive playing pieces. The same RF inductive coupling is used to download data from a playing piece to the games module.

RF inductive coupling between the games module and playing pieces is advantageous because such coupling is possible over a large distance range. However, this very advantage presents problems if it is desired to couple a number of playing pieces to respective different RF coils of the same games module. For example, in the case of a board game, even if each of the playing pieces is tuned to a different RF frequency, interference between the different playing pieces makes it very difficult to produce an apparatus which will operate satisfactorily in practice.

U.S. Pat. No. 5,190,285 describes an electronic game wherein data regarding the characteristics of a player in a video game is downloaded to the video game from a game piece to which power is supplied via a game board. Data is downloaded from the game pieces to the video game via a serial capacitive connection. U.S. Pat. No. 5,190,285 still requires power to be transferred via RF inductive coupling requiring the manufacture of coils and related components which are relatively complex and difficult to manufacture.

SUMMARY

In one aspect, the present invention provides games apparatus wherein a playing piece both derives power from and communicates data with a games module by capacitive rather than inductive coupling.

The use of capacitive coupling between the games module and playing piece to enable both power supply to the playing piece from the games module and data communication enables the games apparatus to be associated with a number of playing pieces coupled to the games module by means of different sensing areas of the games module without the risk of interference between the playing pieces even when they are placed close to one another. Such apparatus is also relatively low power and, because the coupling of the playing pieces to the games module does not require the use of tuned resonant circuits, the areas via which power is supplied to and data communicated with subsidiary playing pieces and conductive connections to these areas within the games module may be relatively high resistance enabling them to be formed by conductive inks and so to be printed onto insulative materials such as paper, card or plastics. This makes the games apparatus both cheap and simple to manufacture.

In one aspect, the present invention provides games apparatus wherein a playing piece derives power from a games module via an electrical circuit which is completed only when a person or other body is capacitively coupled with the playing piece generally being in physical contact with or in close proximity to the playing piece. The return path to the games module may be completed by the person or other body making physical contact with or touching an area of the games module. Desirably, however, the electrical path is completed via a high impedance weak coupling which is inherently present, for example a capacitive coupling between a person and the games module due to the proximity of the person to the games module, the inevitable coupling of the person and the games module to a local ground or earth, the coupling (possibly via interwinding capacitance of a transformer) through a power supply of the games module to a mains electrical supply earth, coupling through a ground plane provided in the games module or any combination thereof.

In one aspect, the present invention provides games apparatus which provides a single conductive lead or track between a games module and the playing piece with a return path enabling power to be supplied to the playing piece from the games module and data to be communicated between the two being provided by a person or other body in close proximity to or touching the playing piece. The use of a single lead or track per playing piece considerably reduces the complexity and amount of conductive track required in the games module, reducing costs and allowing the sensing areas of the games module via which the games module supplies power to and communicates data with playing pieces to be placed closer together so allowing a higher density of playing pieces per games module.

As discussed above, the present invention enables conductive tracks and sensing areas to be printed using, for example, conductive inks, which is a relatively cheap mass production process. Moreover such printing can be onto any suitable insulative material such as the card, paper or plastics materials commonly used to form playing surfaces for board games and children's toys.

The playing piece may have memory means for storing game data and may be operable to communicate the game data to the games module in response to receipt of a data communication control signal from the games module. This data communication control signal may be the same signal as the signal supplied to the sensing surface to enable determination of the location of the playing piece on the sensing surface.

Data may be communicated by modulation by the playing piece of a carrier supplied by the games module from which the games module derives its power. The games module may contain a non-volatile memory which stores data that can be accessed by the games module only when power is derived by the playing piece. The non-volatile memory may be electrically reprogrammable so as to allow, for example, the gaming apparatus or other playing pieces to change the content of the playing piece's memory. The data may simply identify the playing piece enabling the games module to respond in accordance with the determined identity. As another possibility the data may simply be audio data which may be downloaded from the playing piece.

Where data is stored by a playing piece it will generally be digital data for subsequent processing. However, especially where the stored data is audio data, the data may be downloaded as analogue data enabling driving, via an appropriate interface, of a loudspeaker, for example. Generally in such cases the data will be converted from digital to analogue by the playing piece. Alternatively, the data could be stored as analogue data in an analogue memory. Where the data stored by a playing piece identifies the playing piece then, for example, the games module may cause a sound, tune, message or instruction to be issued, or may adjust the rules of the game in accordance with the identity of the playing piece and/or its location. The data for controlling the action of the games module in response to the detection of a particular playing piece may be stored in a non-volatile memory in the playing piece, in the games module or in both the playing piece and the games module.

Where the power supply to a playing piece is sufficient, the playing piece itself may have a low power loudspeaker, for example a piezoelectric loudspeaker, and an audio interface enabling it to issue short sounds or beeps, a low power LCD display and driver for displaying short messages or a very low power slow flash rate LED. The playing piece may also incorporate an optical shutter, for example a low power LCD shutter, which obscures a picture or message until the playing piece and thus the optical shutter receives power. If power permits, the playing piece may have a motor and motor control interface controllable in response to the data stored in the playing piece. Such a motor would necessarily be very low power, typically about 250 $\mu$W (micro-Watts) and may be capable of executing small movements such as the opening or closing of a toy's eye.

Data contained in the memory of the playing piece may comprise data concerning features, strengths and information about the particular playing piece especially where, for example, the game is a role-playing or war game.

Where the games module of the gaming apparatus includes software for controlling the game, a playing piece may contain modifications or upgrades to that software so that, for example, the rules or structure of a game may be altered by the incorporation of a new playing piece into the game. This would allow, for example, additional playing pieces to be bought after the initial purchase of the game to enable the owner to upgrade the game or to add additional features to the game.

In another aspect, the present invention provides a playing piece for use in the above-described gaming apparatus wherein the playing piece has a memory for storing data and is arranged to derive power for enabling reading of data from the memory from a signal supplied by the gaming apparatus only when a player contacts the playing piece.

The present invention also provides a component for use in a game or a toy or toy component having a memory and means for deriving a power supply only when a person makes contact with the component.

BRIEF DESCRIPTION OF THE DRAWINGS

The accompanying drawings, which are incorporated in and constitute a part of this specification, illustrate exemplary embodiments of the invention and, together with the description, serve to explain principles of the invention. In the drawings:

FIG. 11a shows a view similar to FIG. 11 to illustrate a modified version of the playing piece shown in FIG. 11;

DETAILED DESCRIPTION

Embodiments of the present invention will now be described, by way of example, with reference to the accompanying drawings.

Figure 1:
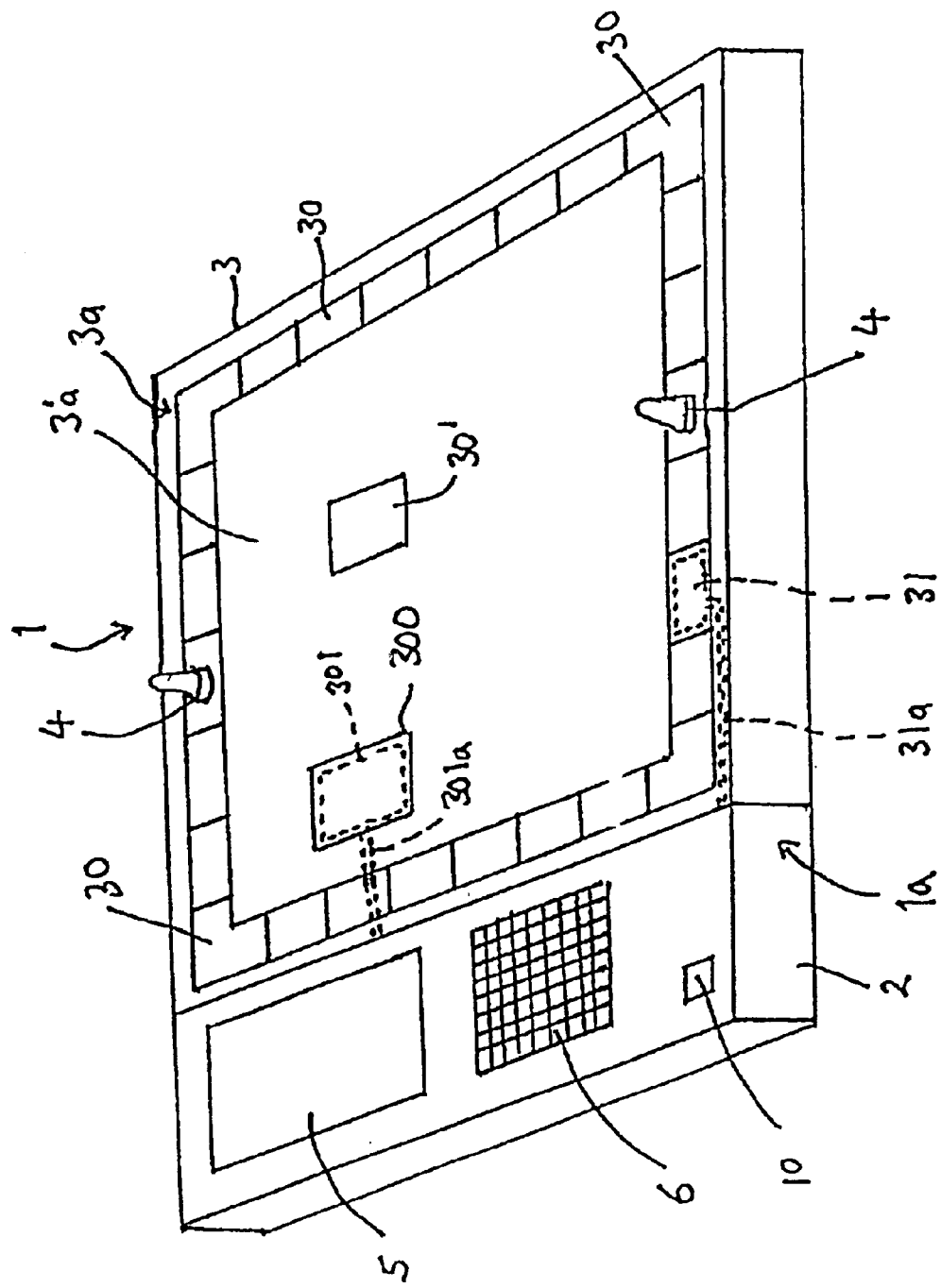
FIG. 1 shows a diagrammatic perspective view of gaming apparatus embodying the invention.

Referring now to FIG. 1, a gaming apparatus 1 embodying the present invention comprises a games module 2 directly connected to a game board 3 (generally having a cardboard or plastics substrate) having a playing surface 3a divided into playing areas 30 each of which may be occupied playing pieces 4 in the form of passive, i.e. not self-powered, components. Generally the games module 2 will be provided within a housing 1a which also supports the game board 3. As shown, the playing areas 30 form a series of playing squares defining a path to be followed by the playing pieces 4. As is known in the art, each playing area 30 may contain instructions to be carried out or questions to be answered by a person whose playing piece 4 lands on that square.

Each playing area 30 contains a sensing pad 31 in the form of an electrically conductive area. The sensing pads 31 are hidden beneath a paper or plastics top surface 3'a of the playing surface 3a and are thus shown in phantom lines.

Each sensing pad 31 is electrically coupled to a pcb (not shown) carrying the components of the games module 2 via a respective different one of a plurality of conductive tracks and an appropriate pcb connector (not shown). In the interests of simplicity, only one conductive track 31a is shown in phantom lines in FIG. 1.

The sensing pads 31 and conductive tracks are printed onto the underside of the top surface 3'a of the game board 3 by conventional printing techniques, such as screen printing of an electrically conductive material, typically a silver or carbon loaded conductive ink.

Figure 2:
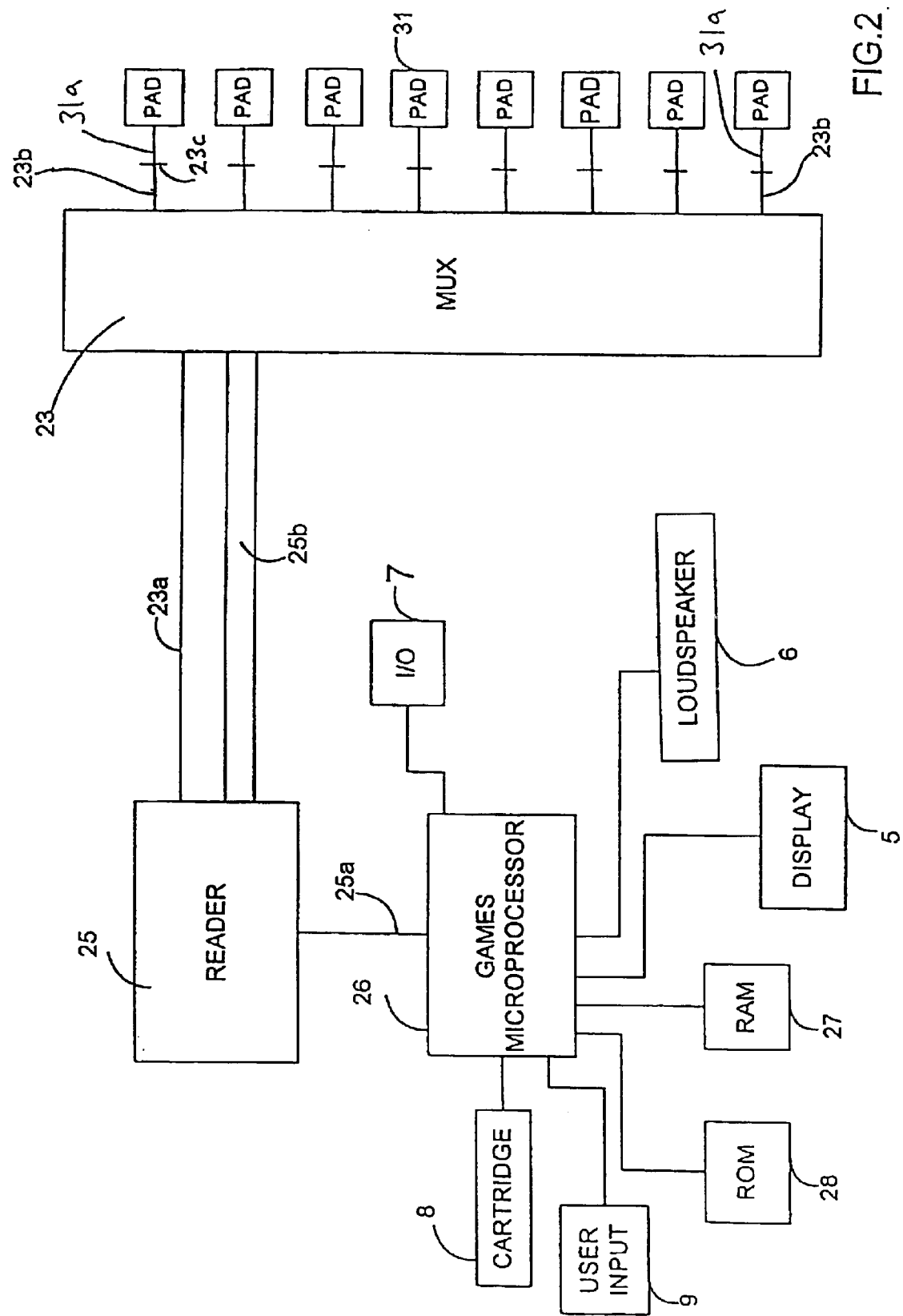
FIG. 2 shows a block diagram of an embodiment of a games module of the apparatus shown in FIG. 1.

FIG. 2 shows an overall block diagram of the gaming apparatus.

Each sensing pad 31 is connected via its conductive track 31a to a respective one of a plurality of switched input/output lines 23b of a multiplexer 23. The connection of a track 31a to its switched input/output line 23b is shown simply by line 23c in FIG. 2. A multiplexed or common signal line 23a of the multiplexer 23 is connected to a reader 25.

As will be described in detail below, the reader 25 generates an rf (radio frequency) signal which is supplied via the multiplexer 23 to the sensing pads 31 and when a player places and holds a playing piece 4 on a playing area 30 modulated data is supplied via the multiplexer 23 to the reader 25 which demodulates the data and supplies data on line 25a to a games microprocessor 26 which controls game play. The reader 25 controls operation of the multiplexer 23 via bus 25b as will be described below.

The games microprocessor 26 is, in this example, associated with a random access memory 27 and a read-only memory 28 which may store game play information or data, a display 5 such as an LCD display for displaying still or video image data, a loudspeaker 6, an input/output interface 7 for, for example, coupling to a motor controller and a removable disc drive 8, for example a CD ROM drive or a bay for receiving a games cartridge. It will, of course, be appreciated that, although not shown, the display, loudspeaker, motor controller and input/output interface are connected to the microprocessor via appropriate interfaces. A user operable input device 9 in the form of a pointing device such as a mouse and/or a keyboard may also be provided.

Although not shown in FIG. 2, it will be appreciated that the components of the gaming apparatus 1 will be powered by a battery or from a mains AC (Alternating Current) supply usually via an appropriate transformer. FIG. 1 shows a power supply ON/OFF switch 10 of the games module 2.

Figure 3:
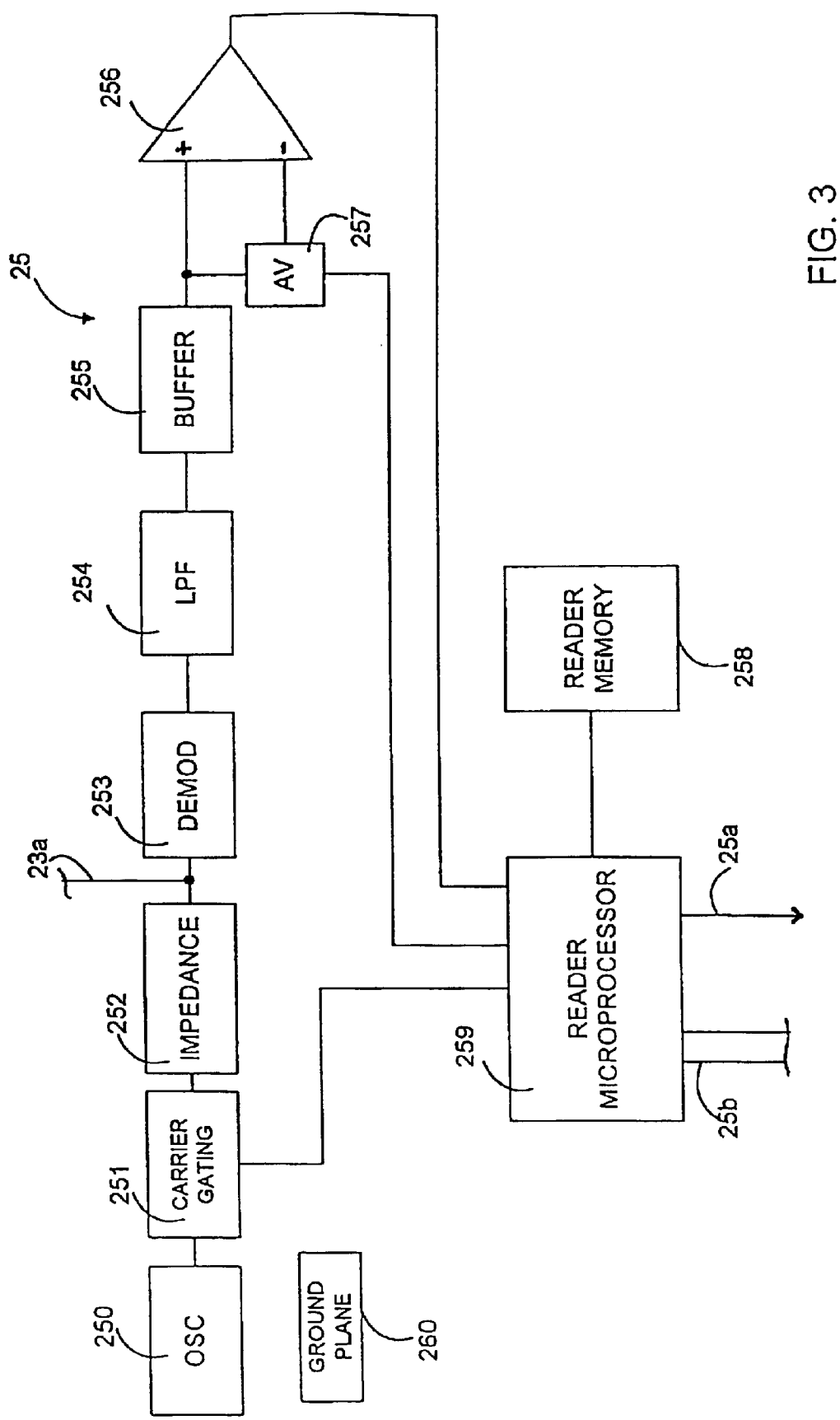
FIG. 3 shows a block diagram of an embodiment of a reader for the games module shown in FIG.2.

FIG. 3 shows an embodiment of the reader 25 which comprises a high frequency signal source or oscillator (OSC) 250. In this example, the oscillator provides a 13.56 MHz (Mega Hertz) AC signal. The output of the signal source 250 is coupled via a carrier gating circuit 251 and an impedance 252 to the multiplexed or common signal line 23a of the multiplexer 23 (not shown in FIG. 3). The impedance 252 will normally be internal to the oscillator 250 but may be provided in any appropriate part or stage of the reader circuitry. The common signal line 23a is also coupled to a demodulator 253 which, in this example, is in the form of a simple diode rectifier. The demodulator 253 in combination with a subsequent low pass filter 254 enables the modulation to be recovered from an amplitude modulated signal.

The output of the low pass filter 254 is supplied via a low impedance buffer 255 to the positive input of a comparator 256. The output of the buffer 255 is also supplied via an averaging circuit 257 to the negative or inverting input of the comparator 256.

The output of the comparator 256 provides a demodulated encoded data signal to a reader microprocessor or microcontroller 259 having a serial memory 258. The microcontroller 259 may be a PIC16C71 microcontroller while the memory 258 may be a W55206B serial RAM. The reader microcontroller 259 also controls interruption by the carrier gating circuit 251 of the oscillator 250 output to provide a signal from which the playing pieces can derive a clock signal as will be described below.

Data decoded by the reader microprocessor 259 is supplied on data line 25a to the games microprocessor 26 (see FIG. 2). The symbol referenced 260 in FIG. 3 represents a ground plane of the reader 25 and its role in the operation of the apparatus will be discussed below with reference to FIG. 6.

The multiplexer 23 and reader 25 may have any suitable conventional form. For example, the multiplexer may be a 4051 multiplexer controlled by the reader microcontroller 259 or an array of diode switches or transmission gates switchable by the reader microcontroller 259 with the input/output lines 23b being coupled to ground when not in use. The carrier gating circuit 251 may be a logic circuit or a transistor switch which switches off the carrier signal to the RF line 23a in accordance with a signal received from the reader microcontroller 259. The averaging circuit 257 will generally consist of an averaging capacitor connected between the inverting input of the comparator 256 and ground by a transistor switch or transmission gate which is conducting while the carrier signal is present and after transients have settled but is off while the carrier is off and during carrier turn-on transients so that averaging is only carried out while there is a steady carrier signal.

Figure 4:
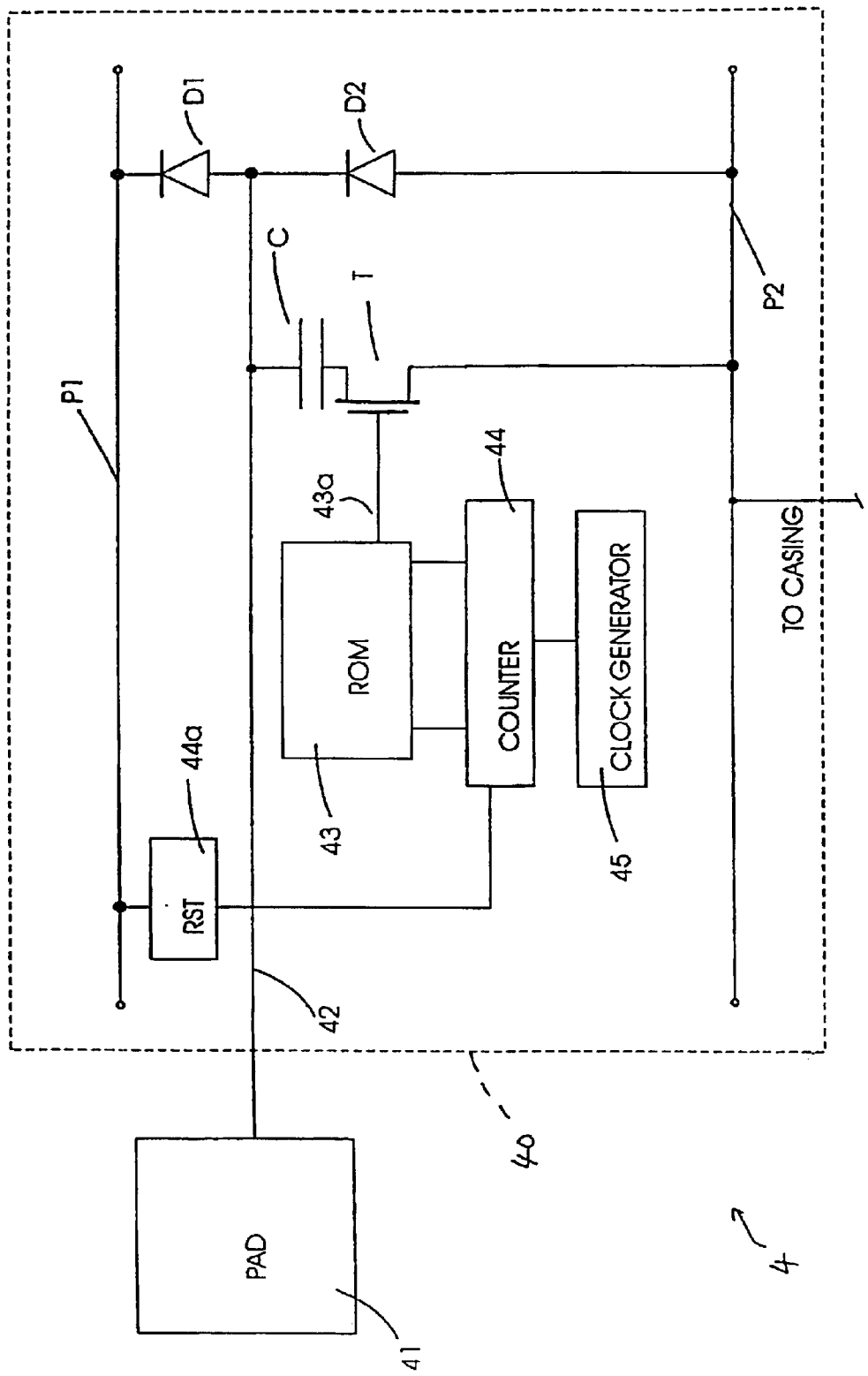
FIG. 4 shows a block diagram of an embodiment of circuitry incorporated in a playing piece or component for the gaming apparatus shown in FIG. 1.

As shown in FIG. 4, each playing piece 4 has an electrically conductive sensing pad 41 coupled to a signal line 42 connected to a data storage device 40 carried in the playing piece 4. Power supply for the data storage device 40 is derived from an AC signal on the signal line 42 via diodes D1 and D2 coupling the signal line 42 to respective lines P1 and P2 with line P2 being connected, as will be described below with reference to FIG. 5, to the body or casing of the playing piece 4. Typically the data storage device will require a 10 $\mu$A (micro amp), 2.5 volt power supply.

Typically, the area of the sensing pads 31 and 41 may be in the range of from about 25 $mm^2$ to more than 1000 $mm^2$ depending on the power output of the oscillator 250. The sensing pads 31 may be larger than the sensing pads 41 and may for example occupy practically the entire area of the associated playing area 30 so that precise location of a playing piece is not required. Of course, the sensing pads 31 and 41 may have any desired footprint and need not be rectangular or square.

The data storage device 40 in each playing piece has a non-volatile memory, in this case a serial read-only memory, 43 coupled to an address counter 44 clocked by a clock signal derived by a clock signal generator 45 which demodulates the carrier from the oscillator signal supplied by the oscillator 250. Although not shown in FIG. 4, it will be appreciated that the lines P1 and P2 are coupled so as to enable power supply to the ROM 43, counter 44 and clock generator 45. A reset switch (RST) 44a is provided to reset the counter 44 when the power supply on line P1 is off for a predetermined time.

An output 43a of the serial ROM is coupled to the gate of an IGFET T having one of its source and drain electrodes coupled via a capacitor C to the signal line 42. The other of the source and drain electrodes of the IGFET T is connected to the line P2.

Figure 5:
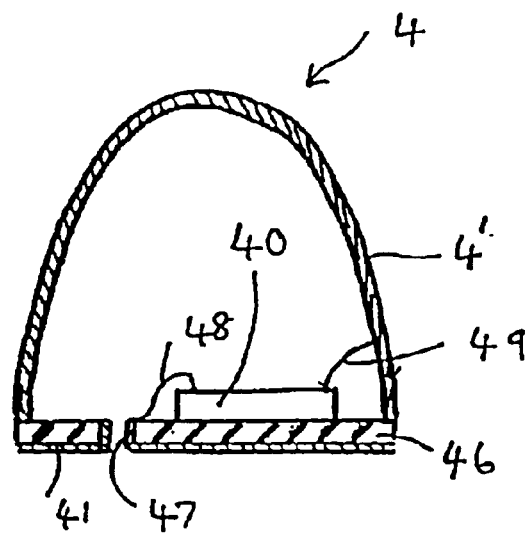
FIG. 5 shows a schematic cross-sectional view through a component or playing piece suitable for use with the gaming apparatus shown in FIG. 1.

FIG. 5 shows a cross-section through a typical construction for a playing piece 4. The playing piece 4 has an electrically conductive hollow body or casing 4'. The data storage device 40 shown in FIG. 4 is mounted on an electrically insulating base 46 of the playing piece. The sensing pad 41 is provided as a copper layer on the exterior surface of the insulating base 46. Connection from the sensing pad 41 to the signal line 42 of the data storage device 40 is provided via a plated hole 47 through the insulating layer 46 and a wire bond 48. The earth or ground terminal P2 of the data storage device 40 is electrically connected via a spring biassing member or clip 49, for example a beryllium wire, to the conductive casing 4'.

It will, of course, be appreciated that the playing pieces 4 may have any shape desired or appropriate for the game to be played using the apparatus. The casing 4' of the playing piece may be cast from metal or may be moulded from an electrically conductive polymer, for example. Because only a capacitive coupling to the player is required the playing piece may have a thin coating of paint or like material.

FIGS. 6a to 6g show functional circuit diagrams for illustrating how one playing piece 4 is coupled to the games module 2 in use.

When a playing piece 4 is placed on a playing area 30 (FIG. 1), the sensing pad 41 of the playing piece is capacitively coupled to the sensing pad 31 of the playing area. Typically, the capacitance will be about 20 pF (pico Farads) giving an impedance of about 480 ohms at 13.56 MHz. A player H touching the playing piece is capacitively coupled with the electrically conductive casing 4' of the playing piece 4. The contact impedance between the player H and the conductive casing of the playing piece is represented by resistor Rc in parallel with capacitor Cc in FIGS. 6a to 6g. Typically, the contact impedance may be of the order of less than 100 ohms, depending upon contact pressure, moisture etc.

As will be appreciated from the above, there is only one electrically conductive track from each sensing pad 31 to the games module 2. To enable power to be derived from the oscillator 250 signal, an electrical circuit must, of course, be completed.

In the embodiment described above, the only strong signal coupling between the games module 2 and a playing piece 4 is between the two sensing pads 31 and 41. A ground (return) path is however provided via several means in differing proportions, depending upon the actual structure of the embodiment and the environment in which the apparatus is located.

Figure 6A:
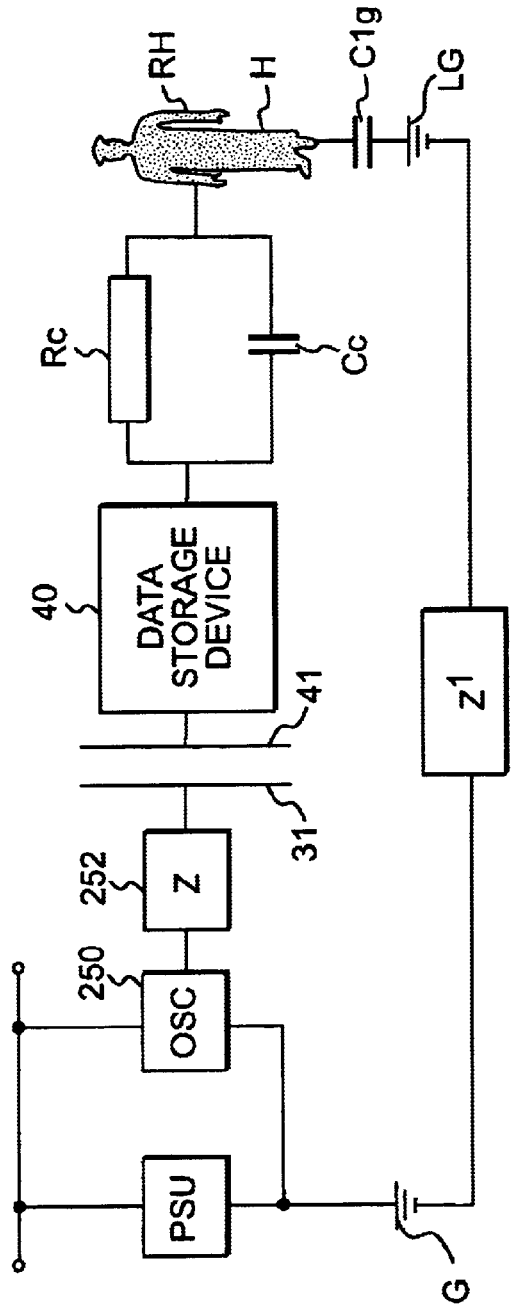
FIGS. 6a to 6h show schematic electrical circuit diagrams for illustrating electrical communication between the games module and a component or playing piece.

FIG. 6a shows an embodiment where the games module has a mains AC supply powered DC power supply unit PSU. In this example, the return path is provided by capacitive coupling (Clg in FIG. 6a) of the player H to the local ground LG and a weakly coupled high impedance ground return path (Z') to the mains power supply PSU ground G. The player H has, as shown in FIG. 6a, a resistance RH. The player may also have an inductive component at certain frequencies.

Figure 6B:
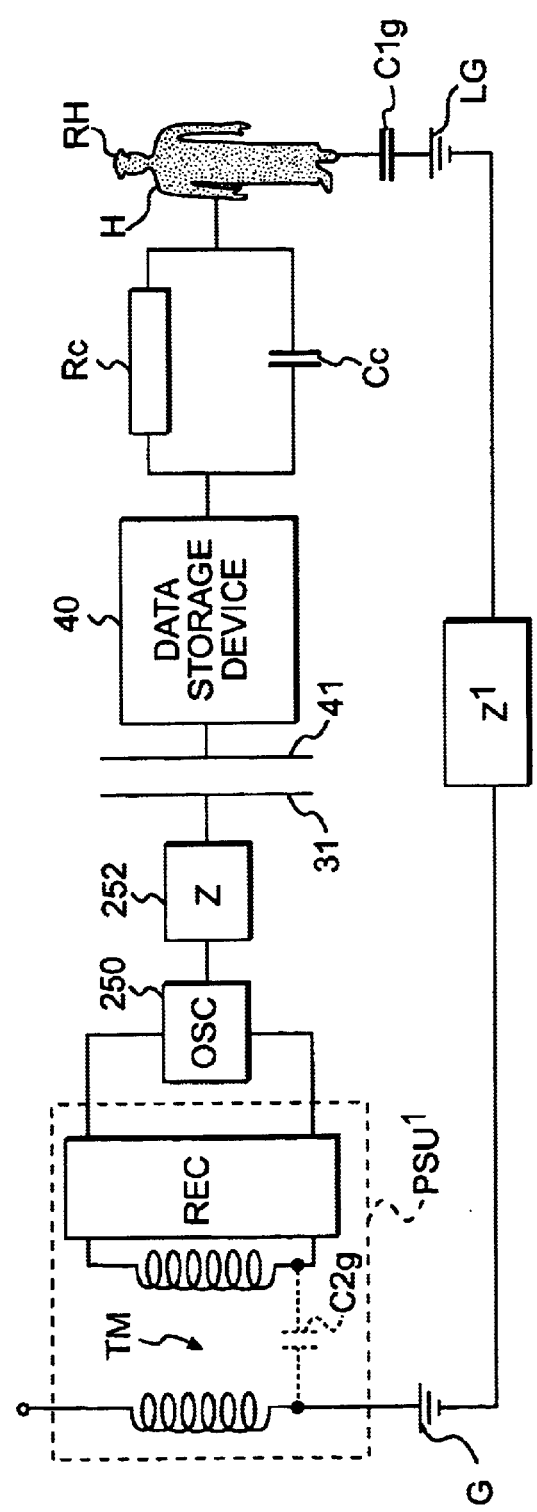

FIG. 6b shows an embodiment where the games module is powered by a mains AC supply powered DC power supply unit PSU' incorporating a transformer TM and rectifier REC. In this case, the weakly coupled high impedance ground return path Z' is completed via the transformer interwinding capacitance C2g shown in phantom lines in FIG. 6b.

Figure 6C:
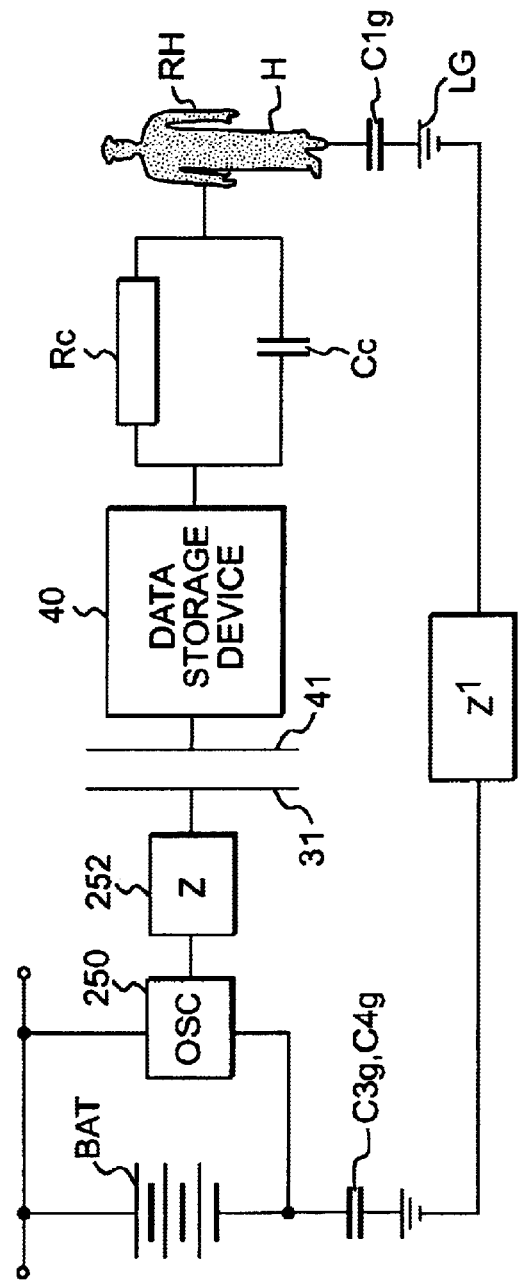
Figure 6D:
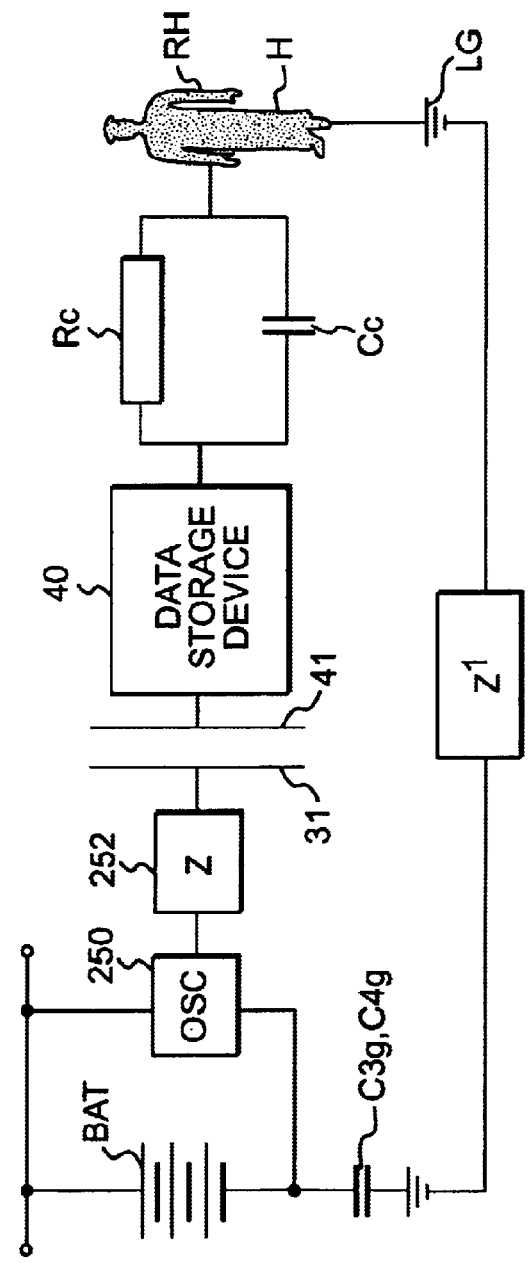
Figure 6E:
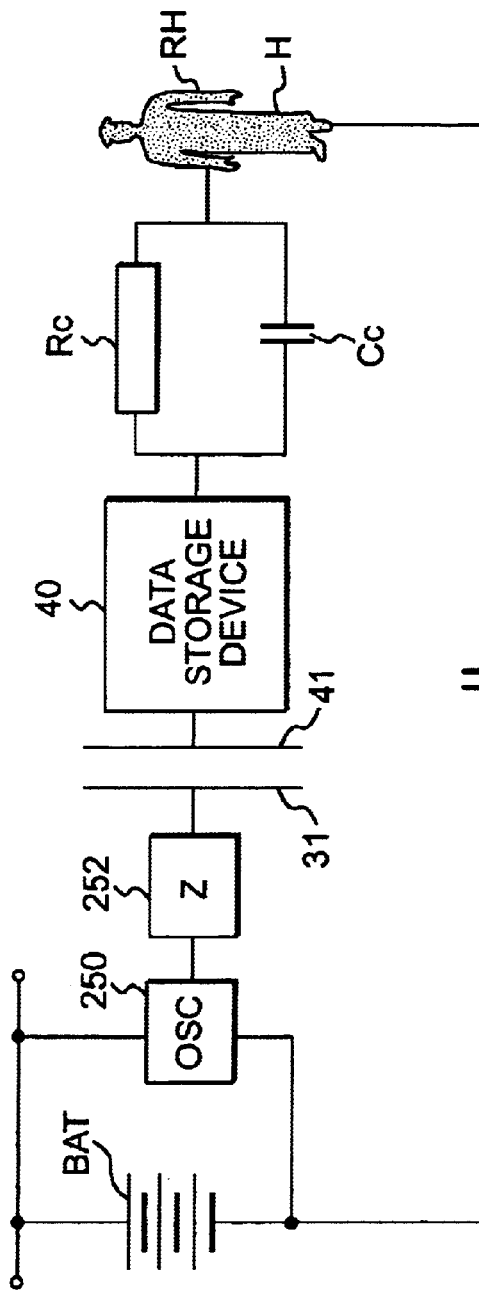

FIG. 6c shows an embodiment where the games module is powered by a battery BAT. In this example, the return path is provided by capacitive coupling (Clg in FIG. 6c) of the player H to the local ground LG and a weakly coupled high impedance ground return path (Z') completed by capacitive coupling C3g provided by a ground plane 260 (FIG. 3) of the games module. The ground plane may be provided by: a specifically provided large grounded conductive layer;

grounded (that is not in use) sensing pads 31 where the number of sensing pads is large; or a combination of these. Alternatively or additionally, there may be a return path completed by capacitive coupling C4g between ground and the apparatus. FIG. 6d shows a modification of the situation shown in FIG. 6c. In FIG. 6d there is a direct coupling of the player H to the local ground. As shown in FIG. 6e, a return path may also be provided by a direct capacitive coupling Cpc between the player H and the apparatus 1.

Figure 6F:
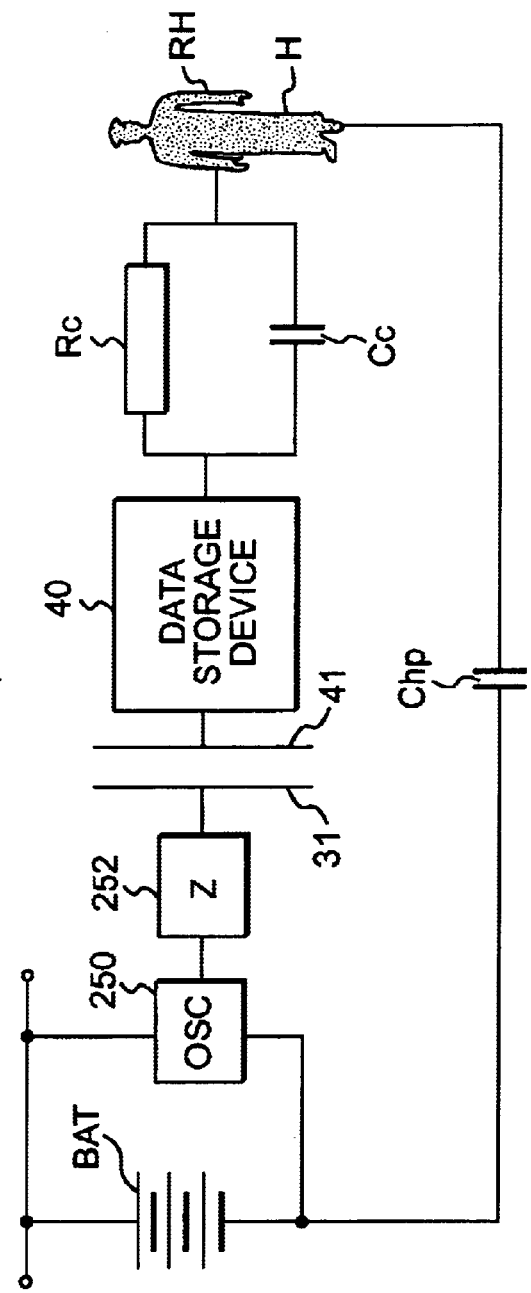
Figure 6G:
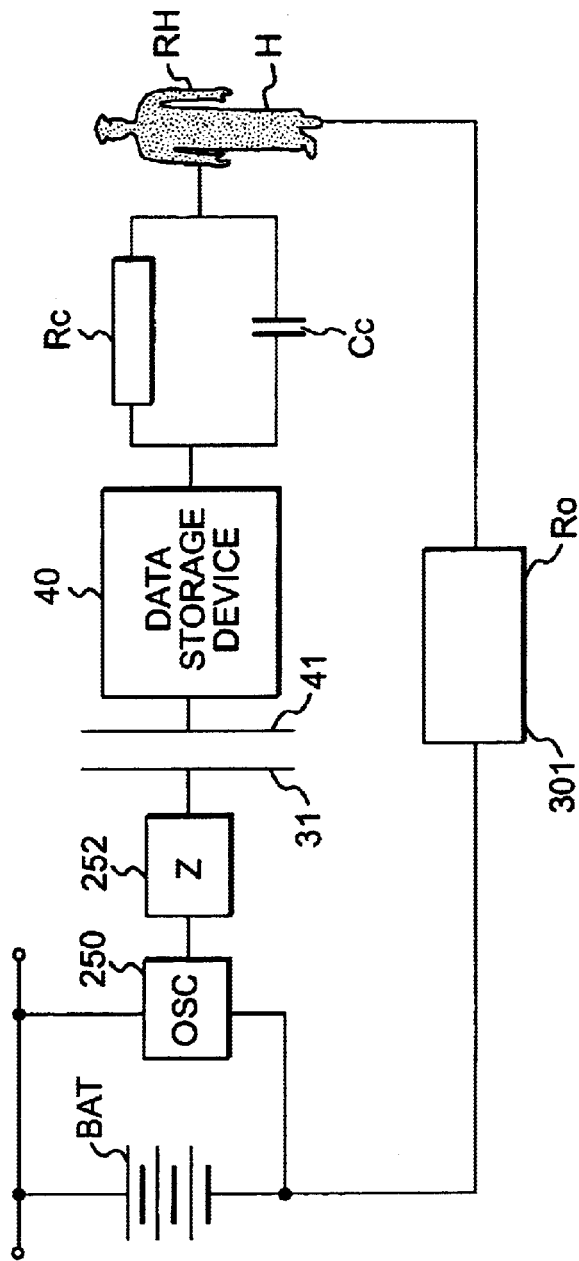
Figure 6H:
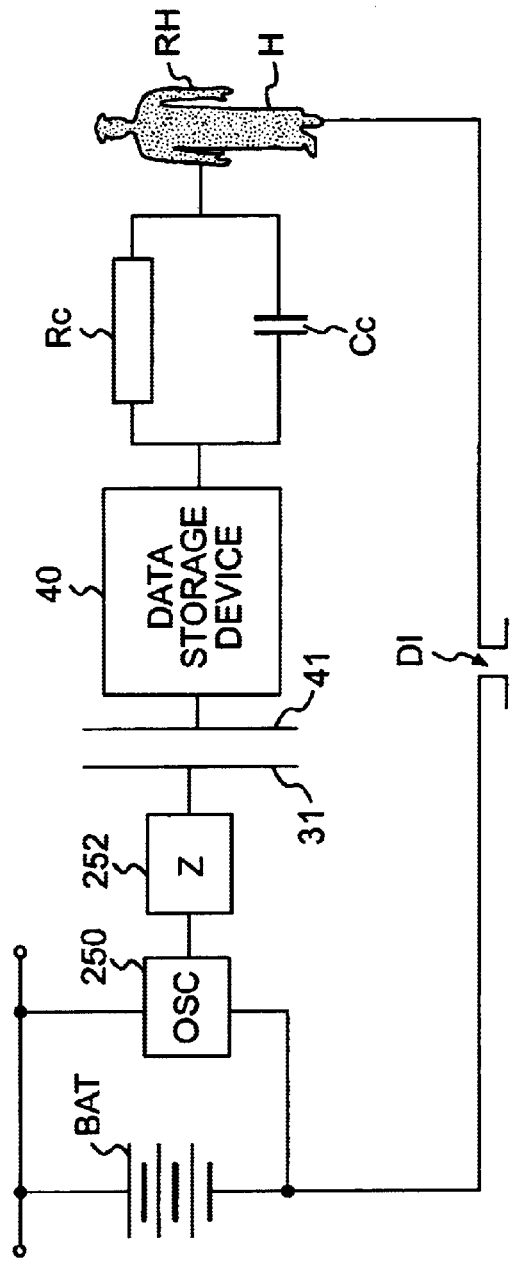

It will be appreciated that the return paths shown in FIGS. 6c to 6e may occur in combination and may also occur in combination with the return paths shown in FIG. 6a where the power supply is directly from the mains or in FIG. 6b where the power supply is from the mains 6b via a transformer. As shown in FIG. 6h, the return electrical path may also be provided by a dipole coupling DI resulting from an electrical field radiating from the player H. This return path may be provided in combination with any one or more of the return paths described above.

The return path(s) that will be most significant in practice will depend upon the actual structure of the apparatus and the environment. It will be appreciated that many of these return paths may occur via one or more man made or naturally occurring objects in the vicinity of the gaming apparatus and that, for example, whether or not an integrated ground plane 260 is necessary will depend on the electrical structure of the apparatus, for example the integrated ground plane may not be necessary if the apparatus is mains powered.

The impedance Z' at the operating frequency given above is likely to be in the order of a kilo-ohm.

Reliance on the above types of return path is, however, not necessary. Thus, the game board 3 may be provided with an additional sensing area 300 having an electrically conductive pad 301 (FIG. 1) which makes direct ohmic contact via a conductive track 301a and the pcb connector (not shown) to the negative terminal of the games module power supply so that the electrical circuit is completed when the player places his playing piece 4 on a playing area 30 and, while still in contact with the playing piece 4, touches the additional pad 301. This, as illustrated in FIG. 6f, provides a direct capacitive coupling Chp where the pad 301 is hidden beneath the additional playing area 300 on the top surface 3'a of the playing surface 3a or, as illustrated in FIG. 6g, provides a direct ohmic contact Ro where the pad 301 is on the top surface 3'a of the playing surface 3.

Accordingly when the player H places and holds a playing piece 4 on a playing area 30, and the multiplexer 23 has, under control of the reader microcontroller 259, coupled the associated input/output line 23b to the common signal line 23a, a return path is completed enabling the data storage device 40 shown in FIGS. 4 and 5 to derive power from the carrier signal provided by the oscillator 250. Depending upon power output, the data storage device 40 capacitance and architecture, the power up time of the data storage device 40 may be as little as 100 microseconds. Power is thus supplied to the clock generator 45, address counter 44 and serial ROM 43 (FIG. 4).

The clock generator 45 derives a clock signal from the periodically interrupted oscillator signal provided by the carrier gating circuit 251 under the control of the reader microprocessor 259. The address counter 44 is thus clocked to cause the data stored at each address in the serial ROM 43 to be read out in turn and the serial ROM 43 outputs on line 43a a high or low voltage dependent on whether a 1 or 0 is stored at the address concerned. The IGFET T is thus switched on or off depending on the voltage applied to the line 43a causing the load applied to the line 42 to be varied by the modulation capacitor C.

The impedance 252 must be sufficient to enable the data storage device 40 to modulate the carrier signal and will typically be in the region of 500 ohms.

The varying load on the sensing pad 41 amplitude modulates the carrier signal in accordance with the data read out from the serial ROM 43. As illustrated by FIG. 3, the modulation is recovered from the modulated carrier signal on the common signal line 23a by the demodulator 253 and, after filtering and buffering, the demodulated signal is compared with a running average of the demodulated signal by comparator 256 to provide an output representing a string of zeros and ones representing the demodulated encoded data. The demodulated encoded data is supplied to the reader microprocessor 259 (FIG. 3) for supply to the games microprocessor 26 as will be discussed below with reference to FIG. 8.

Figure 7:
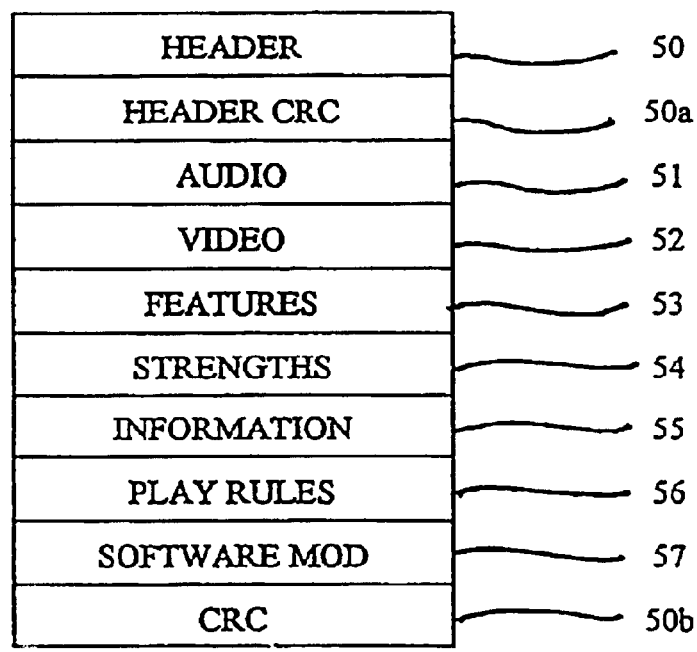
FIG. 7 illustrates diagrammatically typical data which may be stored in a memory of a playing piece or component of the apparatus shown in FIG. 1.

FIG. 7 shows a possible format for data stored in the serial ROM 43. The data comprises an identification code which identifies the particular playing piece to the games module and which is provided in a header 50 of the data. The data may also contain audio information 51 stored in any known conventional audio format (which may or may not be compressed), video information 52 which may be, for example, MPEG encoded, data 53 identifying features or characteristics of the playing piece, data 54 regarding strength of the playing piece and information 55 such as statistics or the like. It will, of course, be appreciated that whether or not any one of the above types of data is stored in the serial ROM will be dependent upon the game for which the playing piece is designed and also on the particular playing piece.

The data stored in the serial ROM may also contain game play rules 56 and software 57 in the form of sub-routines which may be downloaded from the serial ROM into the games module and which may affect the overall operation of the game or the functionality of one or more other playing pieces in the game. The data will also contain, as is known in the art, a header cyclic redundancy check (CRC) 50a and an overall data cyclic redundancy check 50b to enable error detection.

Figure 8:
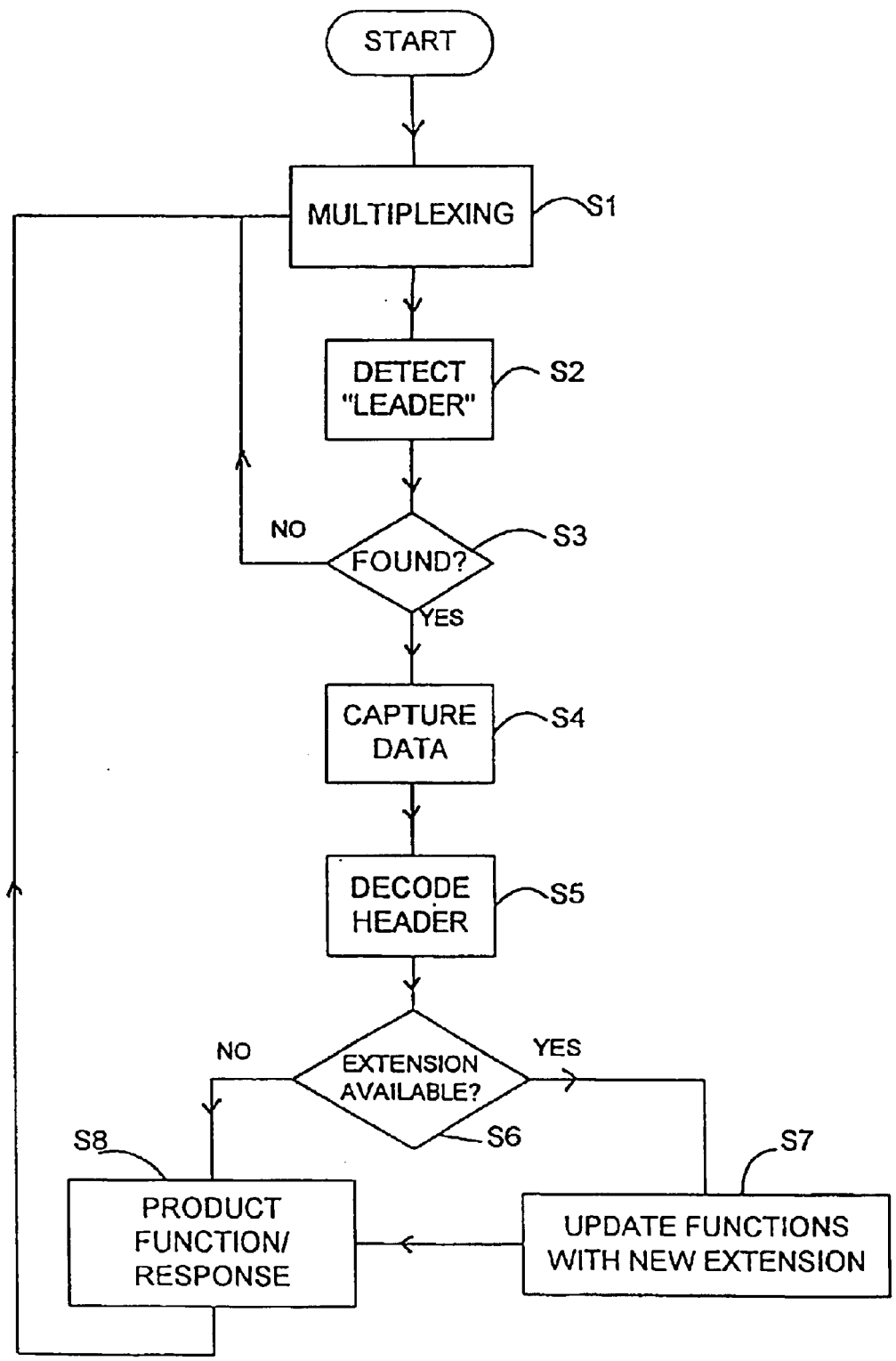
FIG. 8 shows a flow chart for illustrating the operation of the apparatus shown in FIG. 1.

FIG. 8 shows a flowchart for illustrating the process by which the games module 2 detects and acts in accordance with the detection of playing pieces during use of the gaming apparatus shown in FIG. 1.

At step S1, the reader microprocessor 259 controls the multiplexer 23 to select the next sensing pad 31. The reader microprocessor 259 then interrupts the oscillator carrier signal several times to clock the data storage device 40. The oscillator carrier signal is, in this example, interrupted for approximately 3 microseconds each time. Data received back from the data storage device 40 is then checked (step S2) for a leader or synchronisation section so as to confirm that data is really being transmitted and that it is not simply receiving false signals. The presence of a leader is taken to indicate that a playing piece 4 is being held on the associated playing area 30. If the synchronisation section is not received, the reader microprocessor 259 may reset the counter (by switching the carrier signal off for a sufficiently long period to activate the reset circuit 44a) and try again. If the reader microprocessor 259 determines at step S3 that a leader has been detected, then it captures the data from the data storage device 40 at step S4 and stores it in the memory 258.

The reader microprocessor 259 then checks that the header data has been recovered correctly using the header CRC 50a and, if so, decodes the header at step S5 thereby determining the identity of the particular playing piece and also the fact that that particular playing piece is located on the playing area associated with that particular slot of the multiplexed signal.

The reader microprocessor 259 then checks the data CRC 50b. If it is correct the reader microprocessor 259 determines at step S6 whether or not the data carried by the data storage device 40 in the playing piece 4 incorporates extension data which has not previously been incorporated into the game play. Such extension data will usually be in the form of software sub-routines to be added to the software algorithms stored in the game microprocessor's memory and may represent, for example, game rules or features which only come into operation when that particular playing piece is active in the game or is present on a particular playing area 30 or may represent, for example, upgrades of the game software to add general additional features. The extension data may be any data which alters how the game is played as a result of the introduction of that particular playing piece into the game. In an extreme case, the introduction of a new playing piece or combination of pieces may provide the games microprocessor 26 with a completely new version of the game or even a different game entirely.

If extension data is detected, then the reader microprocessor 259 extracts it from the data stream and passes it to the games microprocessor 26 so that it can execute the extended functions at step S7 thereby making the necessary modifications to the game algorithm.

If the reader microprocessor 259 determines at step S5 that there are no extensions in the data transmitted from the data storage device 40 or step S7 has already been carried out, the reader microprocessor proceeds to decode product function/response data which may comprise, for example, audio information, video information and features, strengths or information about the particular player as listed at 51 to 55 in FIG. 7 and to transfer it to the games microprocessor 26 which acts appropriately (step S8).

If the decoded data storage device 40 data is audio data, then the games microprocessor 26 will cause the loudspeaker 6 to be controlled via an appropriate sound card or interface (not shown in FIG. 2) to play the audio data. For example, the audio data may be a message identifying or associated with the playing piece or a characteristic tune or series of notes.

Where the decoded data is video data, then the games microprocessor 26 will cause, via an appropriate video driver, this to be displayed on the display 5. This would enable, for example, a board game to be accompanied by additional video effects or, for example, to enable a representation of the playing piece to be appropriately located on a displayed representation of the playing board. The display 5 may also be used to display still images.

The data carried by the data storage device 40 may also include features, strengths and other information about the playing piece which the games microprocessor 26 will store in its RAM 27 in association with that playing piece and will use to determine, for example, the interaction of that playing piece with other components of the game. For example, information regarding the features and strengths of a playing piece may be used by the games microprocessor 26 to determine which of two playing pieces takes priority or has the advantage when the two playing pieces come into conflict during the game. For example, if the game is a war game or role-playing game, this information may determine whether the playing piece or an opponent on the board is victorious.

The games microprocessor 26 may perform other functions. For example, when the games microprocessor 26 determines that a playing piece has landed on a particular playing area, it may cause the loudspeaker 6 or the display 5 to provide the players with a message related to that particular playing area. This message may be independent of the particular playing piece, for example it may simply identify the playing area on which the piece has landed, or it may be dependent on the combination of the playing piece and the playing area and may be retrieved by the microprocessor from its RAM 27 or ROM 28 using the decoded identification of the playing piece. For example, when the playing piece lands on a particular playing area, the games microprocessor 26 may cause the loudspeaker 6 to issue verbal instructions or commands to the player responsible for that playing piece, for example requesting that the player execute a forfeit, move to another playing area, pay a fine or answer a question. In the latter case, the games microprocessor may display the question on the display 5 asking the user to provide or select, using user operable means such as a mouse or other pointing device 9 (FIG. 2), the correct answer to the question and may then determine the further progress of the playing piece in the game in accordance with the player's answer to the question. The type of question asked and/or the level of difficulty of the question may be determined independently of the playing piece or may be determined by the identity of the playing piece. Certain playing areas may be specific to specific playing pieces and may allow the player handling that piece to access status information. The player may be provided with headphones so that this can be done secretly. The headphones may be connectable to a headphone socket (not shown) of the games module or may be wireless headphones that communicate with the games module via wireless communications such as RF or IR (infrared) communications. The games microprocessor 26 may also be programmed to provide messages, either visually or audibly, to inform other players when a particular playing piece has made an illegal move.

Once the reader microprocessor 259 has successfully retrieved the data from a playing piece on a particular sensing area 31 it controls the multiplexer 23 (step S1) and repeats steps S2 to S8 for the next sensing area 31. If the reader microprocessor 259 does not successfully retrieve the data it may either extend the time slot for that sensing area and try again or may decide to leave that sensing area and to try again later; which course of action is selected will depend upon the speed of the game being played.

The order in which the reader microprocessor 259 switches the input/output lines 23b will depend upon the particular game. Where the game requires the pieces to follow predetermined paths around the playing surface 3, then the switched input/output lines 23b may simply be accessed in turn. In other circumstances, the reader microprocessor may use any known standard searching algorithms to locate the playing pieces on the playing surface 3.

The speed of operation of the multiplexer 23 and the microprocessors is so much faster than the human response time (typically 2 milliseconds may be required to identify a playing piece) that the games module can detect the placing of two playing pieces on the same playing area when they are virtually simultaneously placed on the same playing area 30 especially if the data storage devices have different response times, as is known in the art, enabling the data to be read from the devices in succession.

There may, however, be occasions where two playing pieces placed on the same playing area respond at the same time so that the signals from the two playing pieces interfere with one another. To avoid or reduce this possibility, the data storage devices of the playing pieces may implement one of a number of known anti-clash techniques. Anti-clash techniques are described in, for example, WO97/17667, EP-A-0702323, EP-A-0702324 and U.S. Pat. No. 5,883,582, the whole contents of which are hereby incorporated by reference. Thus, for example, the control logic of the data storage device (which in the example shown in FIG. 4 is constituted by the counter 44 and the clock generator 45) may include, as described in WO97/17667, a pseudo random number generator so that the readout of data from the data storage device in response to the signal received from the games module is delayed by a pseudo random time determined by the generated pseudo random number. As another possibility, the control logic of the data storage device may cause the data storage device to transmit its data periodically such that the non-transmission intervals between transmissions are longer than the transmissions and are fixed for a given data storage device but vary between data storage devices due to manufacturing tolerances in the electrical components as described in U.S. Pat. No. 5,883,582. As another possibility, the control logic of the data storage device may, as described in EP-A-0702323, look for certain command codes and only allow data to be read from the games module when it identifies the correct command code. As another possibility, as described in EP-A-0702342, a tree splitting algorithm may be used to identify a single data storage device from amongst the data storage devices on a playing area.

The games microprocessor 26 can also keep track of each playing piece. For example, where the game is a game of skill which requires that a player move a piece along a particular path defined by a number of sensing areas 31, the games microprocessor 26 can determine the speed of travel of the playing piece along that path (i.e. the time between the sensing the playing piece on successive sensing areas 31) and also the accuracy with which the playing piece follows the path by determining whether or not the playing piece actually lands on the required sensing areas in the required order. Also, if the reader microprocessor 259 continues to sense a particular sensing area until a player moves his playing piece to another sensing area, then the games microprocessor 26 can determine how long it takes a player to make a move and may penalise him if the move takes too long or if he lets go of the piece and the reader microprocessor does not sense its presence on another sensing area.

In conventional board games the fate of a playing piece that lands on a particular playing area is determined by the printed information on the playing area and/or fixed rules of the game. Apparatus embodying the invention allows, however, the games microprocessor to determine what happens to a playing piece that lands on a particular playing area so that the state of a playing area (for example whether a player receives a forfeit, reward, forfeits his turn, is eliminated from the game and so on) can be determined solely by the games microprocessor 26 in accordance with the game algorithm. This enables, for example, a particular playing area to have a different state for, for example: different playing pieces; different combinations of playing pieces; dependent upon the relative locations of particular playing pieces one or more of which may be "ghost" pieces that cannot be seen by the players but are simply part of the game algorithm and may move around the board in a manner determined by the games microprocessor; at different times in the game; dependent on the route and/or time taken by the playing piece to reach a particular playing area speed; in dependence upon tasks previously completed and/or items previously collected by the player associated with that playing piece.

In some games the movement of the playing pieces may be determined by an electronic dice which may be displayed by the games module display 5 and may be activated using the user operable means 9 (FIG. 2). Alternatively each player may be provided with a special piece for example a wand or ring having a similar electrical construction to the other playing pieces described with reference to FIGS. 4 and 5 above so that when the player touches a particular playing surface area 30' (FIG. 1) with his wand or ring, the games microprocessor downloads data from the wand or ring and issues instructions via the display 5 or loudspeaker 6 (FIGS. 1 and 2) telling the player what he has to do next. This has particular application for war gaming and role playing games where the instructions may represent a quest or goal to be achieved that depends on the particular playing piece and its status within the current game.

Figure 9:
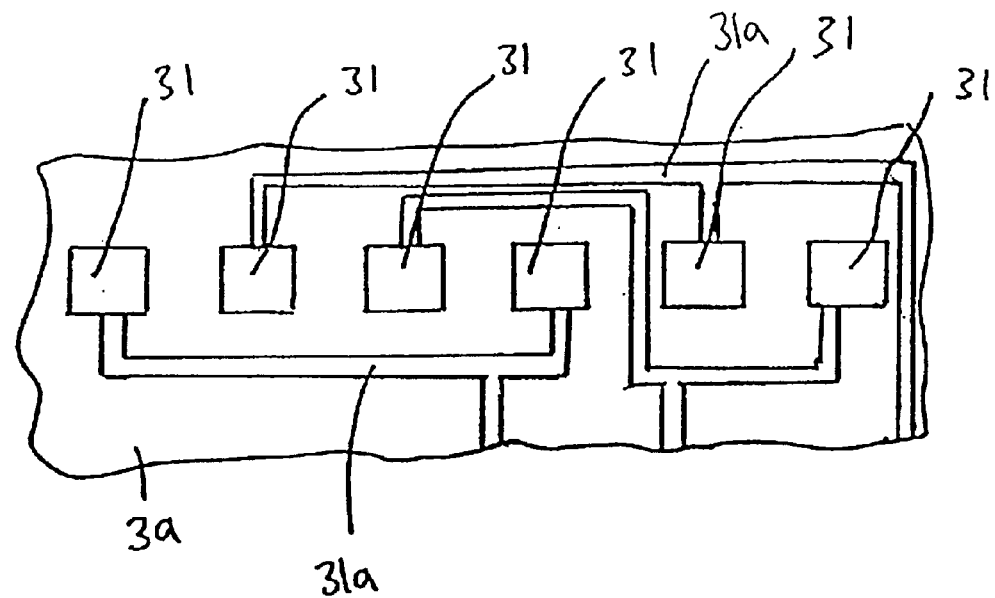
FIG. 9 illustrates block schematically how sensing pads of different playing areas of a board of the gaming apparatus shown in FIG. 1 may be coupled together.

Providing each individual sensing pad 31 with its own input to the multiplexer 23 may become impractical if there are a very large number of sensing pads 31. FIG. 9 shows part of the playing surface 3a (with the upper printed surface removed) of a modified form of the apparatus shown in FIG. 1. In the arrangement shown in FIG. 9, predetermined ones of the sensing pads 31 are ganged together and are connected to the same input of the multiplexer 23. As an illustrative example, FIG. 9 shows six sensing pads 31 divided into three pairs with the first and fourth, second and fifth and third and sixth sensing pads being coupled to respective different ones of the switched input/outputs 23b of the multiplexer.

The arrangement shown in FIG. 9 will still enable the location and direction of movement of a playing piece moving from one playing area to the next to be determined by the games microprocessor 26.

Figure 10:
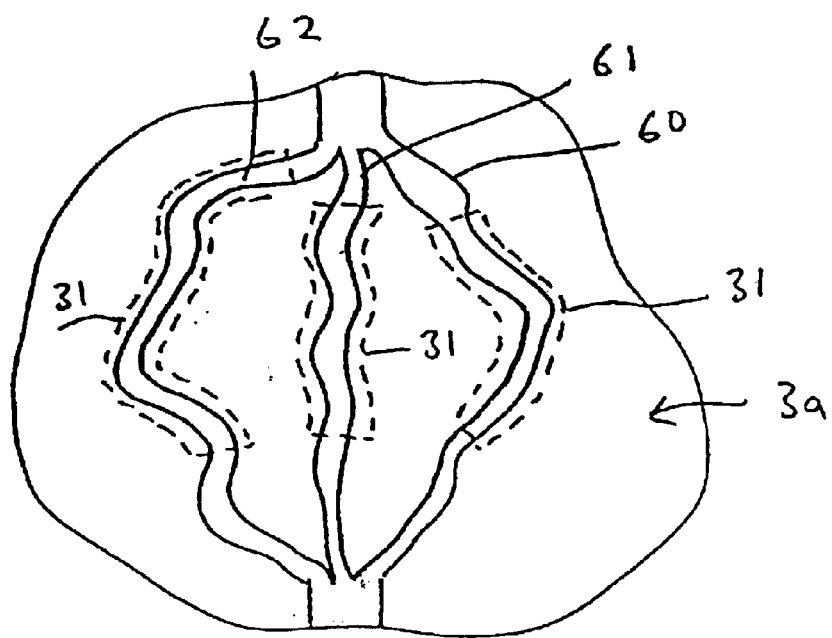
FIG. 10 illustrates schematically part of a game board of a modified form of the apparatus shown in FIG. 1.

FIG. 10 illustrates part of a playing surface to illustrate another facility that can be provided by apparatus embodying the present invention.

The portion of the playing surface 3a shown in FIG. 10 shows three possible paths through an area on the playing surface 3a which may be, for example, intended to represent a swamp or forest or the like. Each of the paths 60, 61 and 62 has an associated sensing pad 31 hidden beneath it. When the player reaches this section of the playing surface, the player has to decide which of the paths 60 to 62 to follow. The microprocessor 259 will monitor the sensing pads 31 as discussed above. When the games microprocessor 26 determines the presence of a playing piece on one of the sensing pads 31, it retrieves from its memory instructions and/or information related to the specific one of the three paths on which the playing piece has been detected and provides an audio and/or video message to the player which determines the subsequent fate or progress of this playing piece in the game. For example, the game rules may be such that only one of the routes 60 to 62 is a safe route through this area and the playing piece will be removed from the game if it follows one of the two unsafe routes. The message provided to the player may be modified in dependence upon the identity of the playing piece detected by the microprocessor as discussed above. For example, only playing pieces having certain characteristics or strengths may be allowed to pass along certain ones of the route. It will, of course, be appreciated that FIG. 10 only shows one possible example and that this could be expanded to more complex alternative paths or situations.

Figure 11:
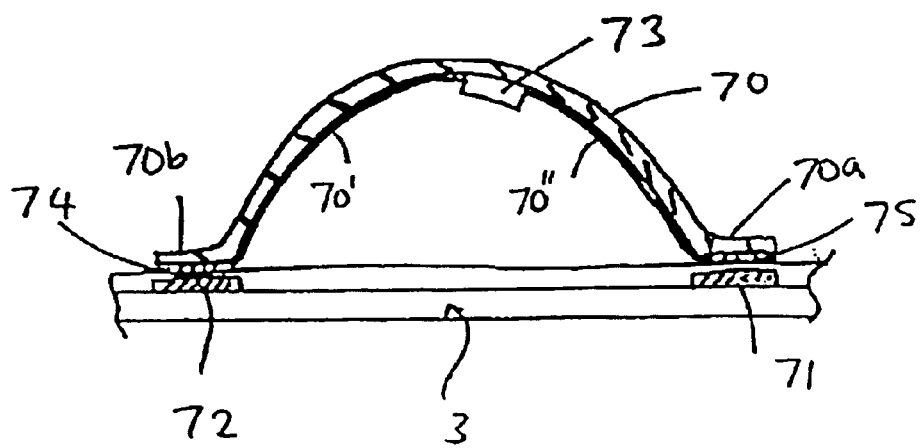
FIG. 11 shows a schematic cross-sectional view of another type of playing piece for use in gaming apparatus embodying the present invention.

FIG. 11 illustrates schematically a cross-sectional view through part of a game board 3 carrying an additional game component in the form of a bridge 70. The area of the game board to which the bridge 70 is mounted has a sensing pad 71 similar to the sensing pads 31 discussed above and a separate contact or return sensing pad 72 which is connected to earth. The bridge 70 has first and second end portions 70a and 70b which, when the bridge is located in position, are respectively located over the sensing pads 71 and the earth contact 72. A passive data storage device 73 is mounted on the underside of the bridge and has its earth contact connected to an electrically conductive sensing pad 74 mounted underneath the end portion 70b by an electrically conductive track 70' provided on the underside of the bridge. The power supply contact of the data storage device 73 is similarly connected to a sensing pad 75 mounted on the underside of the end portion 70a by an electrically conductive track 70". It will thus be appreciated that the bridge 70 shown in FIG. 11 is permanently connected via the game board to the earth connection of the games module when correctly positioned on the board so that the data storage device 73 is permanently powered when power is supplied to the games module 2. The data storage device 73 may contain information comparable to that contained in the playing pieces, for example an identification of the component and features of characteristics of the component and how it relates to the playing pieces. The data storage device 73 may also contain software upgrades for modifying the rules of the game as a result of the introduction of the component 70.

FIG. 11a shows a view similar to FIG. 11 to illustrate a modified version of the playing piece or component shown in FIG. 11. The playing piece or component 700 differs from that shown in FIG. 11 in that the playing piece is designed to be user-activated by means of a switch SW provided in the electrically conductive track 70' and coupled in series with the passive data storage device 73. The switch SW may be a mechanical, optical or electrical switch. In the example shown, the switch SW is a capacitive switch which is closed to complete the conductive path to the data storage device 73 when a user touches the playing piece 700. Closure of the switch SW enables the data storage device 73 to derive power as described above to enable download to the games module of the data stored thereby.

It will be appreciated that all of the playing pieces could be like the bridge 70 shown in FIG. 11 and have a return path to the games module provided by a return sensing pad and return electrically conductive track provided by the playing surface. This would however double the number of conductive tracks required (which would increase costs and severely reduce the maximum possible density of sensing areas for a given playing surface) and would moreover require the players to align the playing pieces with two separate sensing areas which would be undesirable for, for example, fast moving games or for games or toys for small children.

The above-described examples of apparatus embodying the invention relate to a board game wherein players move pieces around a board in accordance with the rules of a game. The present invention may, however, be applied to other games and toys.

Figure 12:
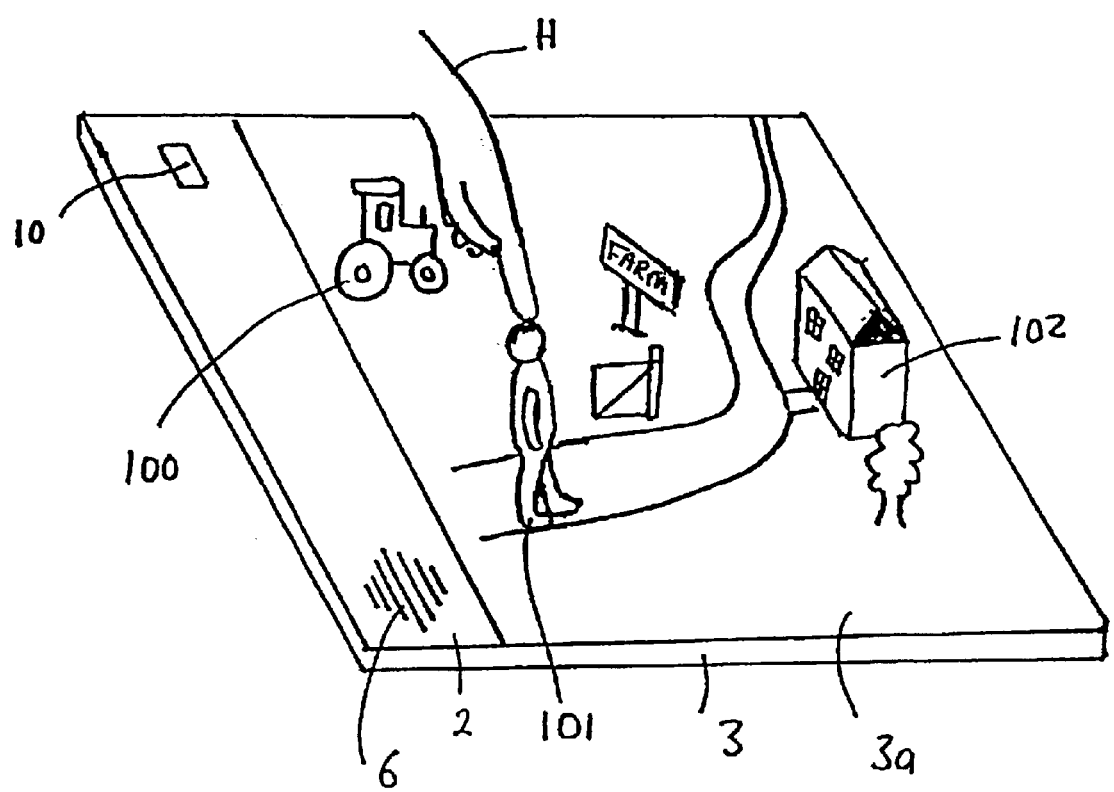
FIG. 12 illustrates another embodiment of apparatus in accordance with the invention.

FIG. 12 shows an example of a toy suitable for a younger child. In this example, the games module 2 is integrated with the games board 3 and the surface of the board represents a farmyard. The toy is supplied with a number of figurines appropriate to a farmyard setting. For example FIG. 12 shows a tractor 100, a farmer 101 and a farmhouse 102. Other possible examples are farm animals such as cows, pigs, sheep, horses, etc. each of which contains a data storage device as described above with reference to FIGS. 4 and 5. The surface of the game board 3 may comprise a single hidden sensing pad similar to the sensing pads 31 (not shown in FIG. 12) in which case the multiplexer 23 or switch described above may be omitted. The data storage device of each of the figurines may contain audio information which, when the child places the figurine on the game board, is downloaded as described above and output via the loudspeaker 6. Alternatively, each figurine may simply contain an identity code which when downloaded to the microprocessor 26 enables the microprocessor to retrieve the appropriate audio file from its memory and to cause the loudspeaker 6 to be activated to transmit the corresponding message. The audio message may be, for example, a spoken word identifying the figurine. In the case of a farmyard animal, the audible message may be a representation of the sound associated with that animal either alone or accompanied by the name of the animal. As an alternative, the game board 3 may be provided with discrete sensing pads each of which may, for example, be provided beneath a picture representing a particular one of the figurines and the games microprocessor 26 may be programmed to cause the loudspeaker 6 to issue a message which varies in dependence on whether the child placed the correct figurine on the picture. Such a game board may be further modified to assist in a child learning to read by replacing the pictures by the names of the figurines.

It will be appreciated that the toy described in FIG. 12 is not restricted to farmyards and that, for example, the game board and the figurines could represent a town or village, a zoo, a kitchen or any other scenario.

As noted above, the games module may be provided with a motor control input/output interface 7. Where such an interface is provided, then data downloaded from a component of a toy such as a motor vehicle or the like may be used to control a motor or motors associated with the component. For example, the components may be figures which are sat on a merry-go-round and the games microprocessor 26 may be programmed so as to adjust the speed at which the merry-go-round rotates in accordance with the specific figures or number of figures sat in the merry-go-round.

Figure 13:
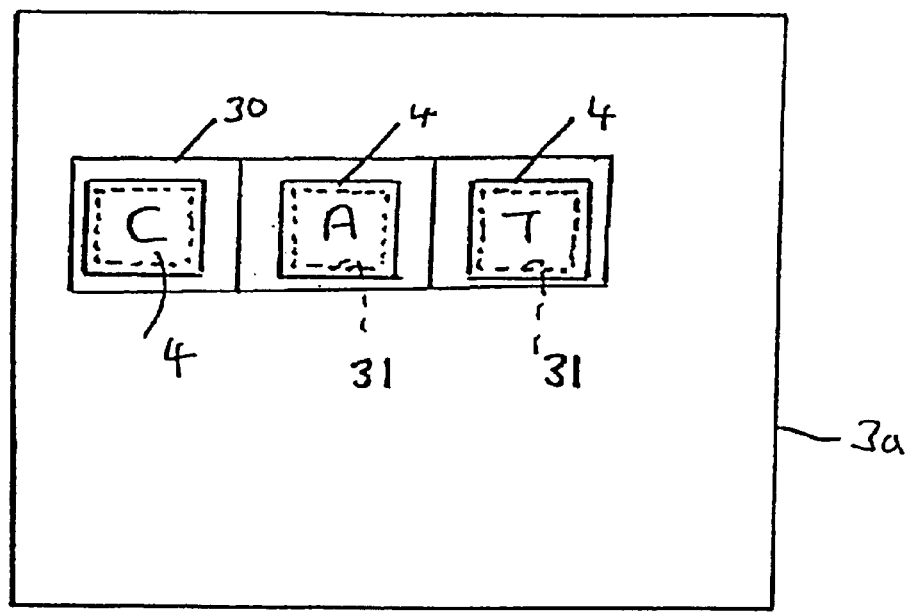
FIGS. 13 and 14 illustrate schematically the playing surfaces of educational games that may be implemented using apparatus embodying the present invention.
Figure 14:
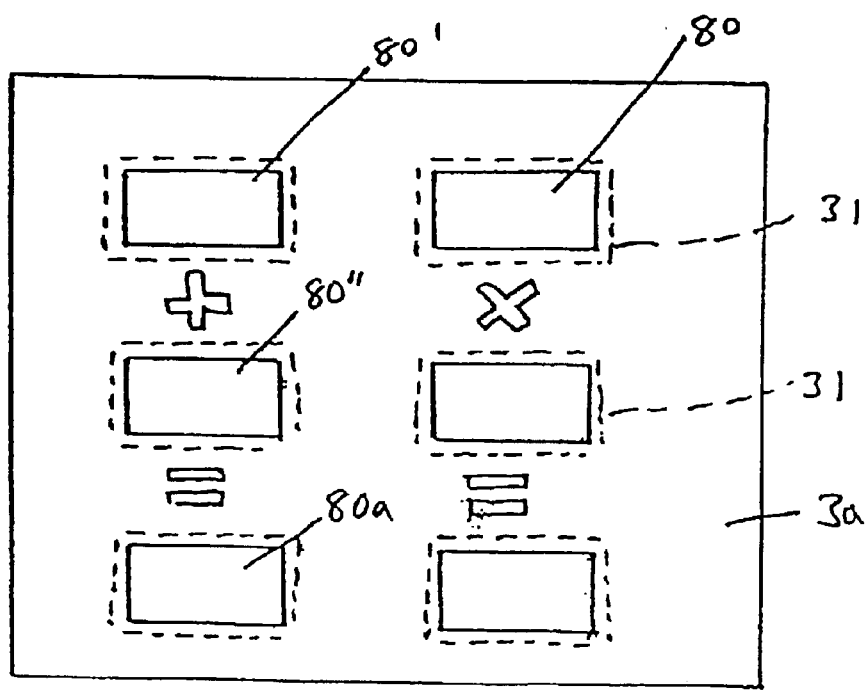

The present invention also has educational uses as illustrated schematically in FIGS. 13 and 14. FIG. 13 shows the playing surface 3a of an educational toy similar to that shown in FIG. 12 having one or more rows of sensing pads 31 (although not shown the games module will generally be integral with the playing surface). In this example, the playing pieces 4 or components supplied with the toy are the letters of the alphabet and the games microprocessor 26 will be programmed so as, for example, to cause the loudspeaker 6 (not shown in FIG. 13) to speak out the name of a letter when it is placed on a sensing pad and, when letters are arranged in a predetermined order to spell a word, to cause the loudspeaker to pronounce that word, for example the word 'CAT' as shown.

FIG. 14 shows the playing surface 3a of a mathematical educational toy having printed squares 80 underneath which are provided sensing pads 31. As shown in FIG. 14, the playing surface 3a is printed with mathematical symbols coupling pairs of the squares 80. In this case, the toy is provided with a series of playing pieces or components (not shown) carrying numbers and when a child places a particular numbered playing piece onto the playing surface 3a, the games microprocessor 26 downloads information from the playing piece and causes the loudspeaker 6 (not shown in FIG. 14) to issue the name of the number. Furthermore, the games microprocessor 26 may be programmed to advise a child whether or not the numbered components which he has placed on the board are correct and, for example, whether numbers placed on squares 80' and 80" add up to the number placed on the square 80a.

In some circumstances it may be desirable to know precisely where a playing piece is within a playing area. For example in the arrangement shown in FIG. 10 it may be desirable to know the location along the track 60, 61 or 62. This could be achieved by providing discrete insulative protrusions on an insulating layer on the underside of a conductive area 31 so that the protrusions contact the top one of two carbon tracks provided one on top of the other and contact is made between the two carbon tracks when a protrusion is pressed down onto the carbon tracks by a playing piece. As is known, by measuring the resistance across various points such as between opposite ends of each carbon track and opposite ends on different conductive tracks, the location at which the deformation occurred within the area of the conductive tracks can be determined.

Figure 15:
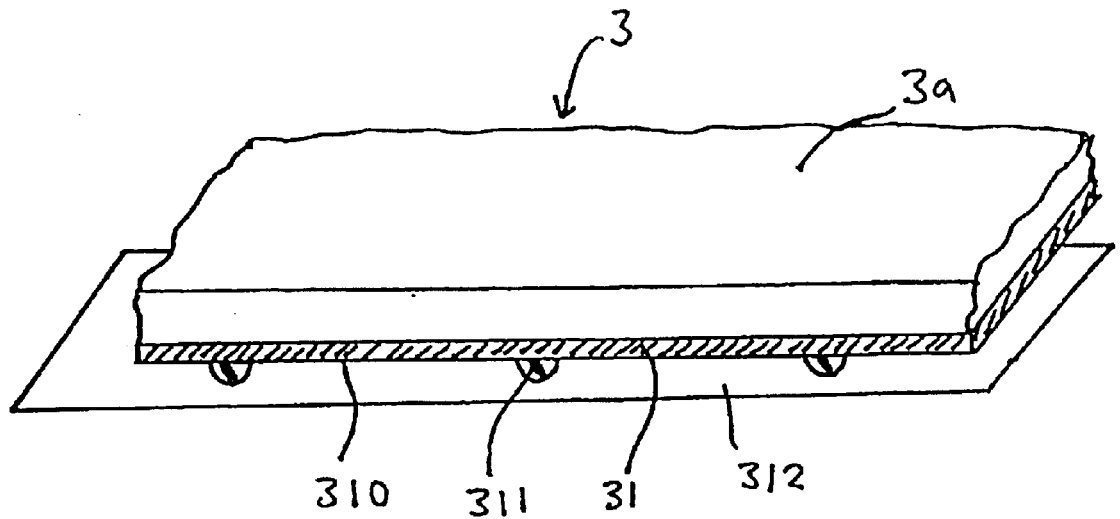
FIG. 15 illustrates very schematically one way of identifying more precisely the location of a playing piece within a playing area.

FIG. 15 illustrates very schematically a modified form of this position location arrangement. In FIG. 15, the sensing area 31 is printed on the underside of the playing surface 3a (in this case formed of polyester) as described above. However insulative bumps or spacers 311 are printed using an insulative ink at spaced apart locations on the free surface 310 of the sensing area and a printed carbon track 312 is provided beneath the sensing area 31. When a playing piece is placed on the playing area 30, the polyester surface 3a deforms locally so that the conductive sensing area 31 locally contacts the carbon track 312. By measuring the resistance between an end of the carbon track and the conductive area 31, the distance of the point of contact along the carbon track 312 can be determined and supplied to the games microprocessor using known techniques to enable the location of the playing piece along the sensing area to be determined.

Figure 16:
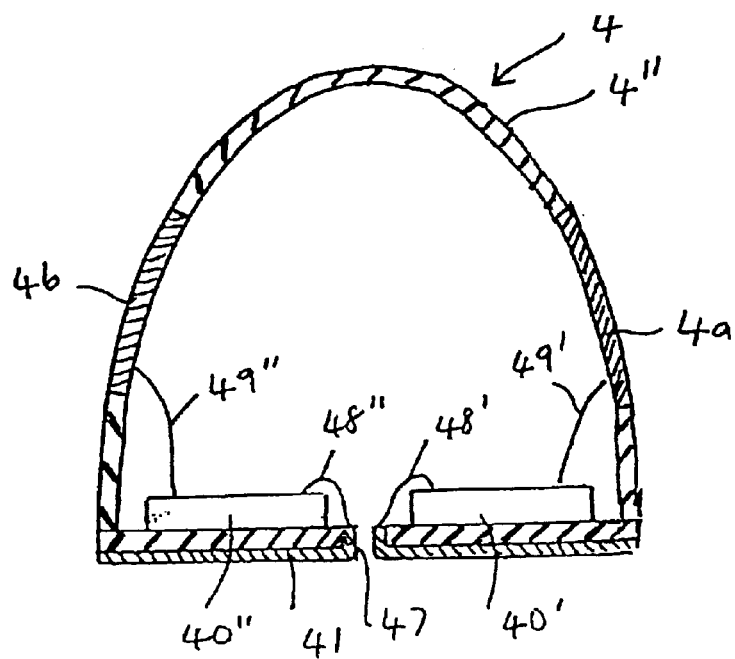
FIGS. 16 and 17 illustrate cross-sectional views through different types of playing piece suitable for use with the apparatus shown in FIG. 1.

In the examples described above, the playing pieces each contain a single data storage device and respond in the same way regardless of where on the conductive casing 4' the player touches the playing piece. This need not, however, necessarily be the case. FIG. 16 shows a cross-sectional view through a modified form of a playing piece. The playing piece 4 shown in FIG. 16 contains two data storage devices 40' and 40" each coupled to the sensing pad 41 via a respective wire bond 48' and 48" and to a respective different one of two electrically conductive areas 4a and 4b of an otherwise electrically insulating casing 4" via a corresponding spring biassing member or clip 49' and 49". In use of such a playing piece, the data that is downloaded from the playing piece when the playing piece is activated will depend upon whether the player makes contact with the electrically conductive area 4a or the electrically conductive area 4b. As discussed above, the data storage devices 40' and 40" may have different response times so that if a player touches both electrically conductive areas 4a and 4b, the data is downloaded first from one of the data storage devices 40' and then from the other data storage device 40". It will, of course, be appreciated that a playing piece may have three or more different data storage devices each coupled to its own respective electrically conductive area with the main constraint on the number of different data storage devices being the physical size of the piece. The two data storage devices may be provided by a single device with a connection being made to separate address sections on the data storage device by the respective wire bonds 49' and 49".

Figure 17:
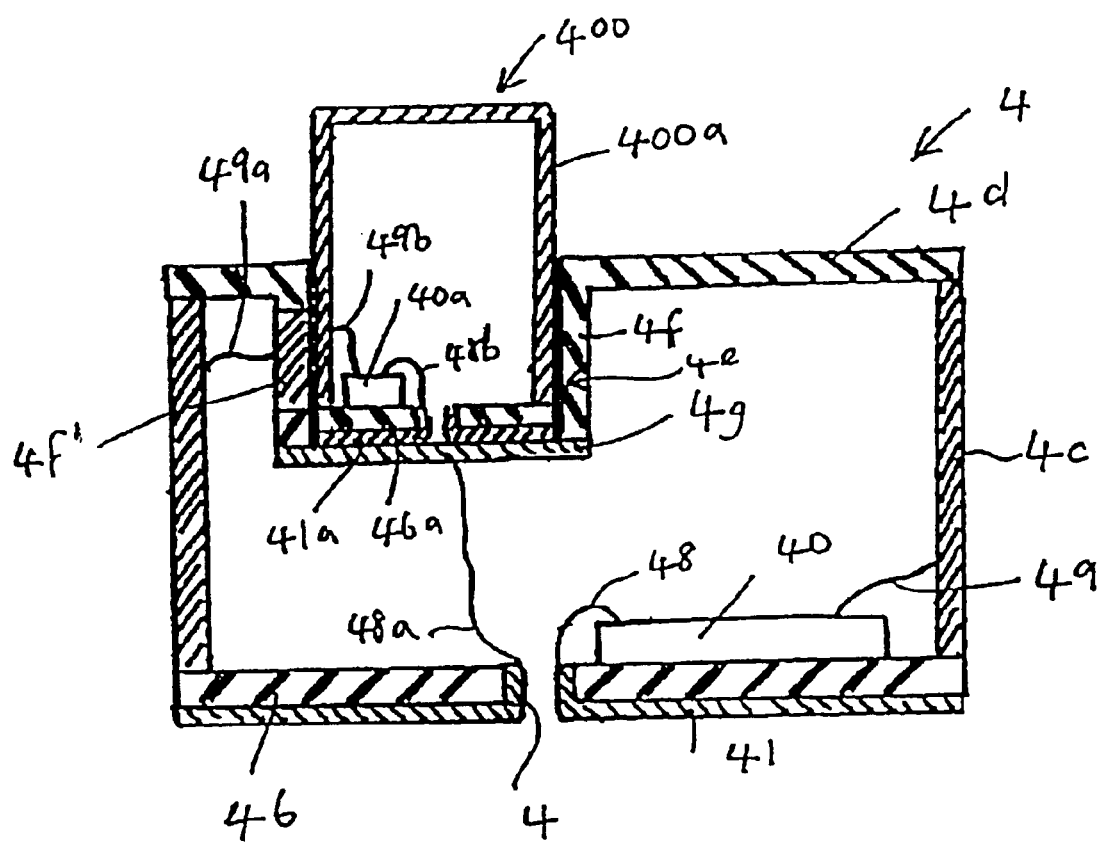

A playing piece may be designed to connect to another playing piece having its own passive data storage device so that, for example, during the course of a game, a player may acquire a weapon such as a sword or the like which, when inserted into an appropriate slot in the playing piece, can transmit its own data to the games module when the playing piece derives power from the games module. FIG. 17 illustrates schematically one example of such a playing piece. In the arrangement shown in FIG. 17, the main playing piece 4 differs from that shown in FIG. 5 in that it has an electrically conductive side wall 4c but an electrically insulating top wall 4d formed with a recess 4e having an electrically conductive area 4f in a mainly electrically insulating side wall 4f and an electrically conductive bottom wall 4g. The electrically conductive bottom wall 4g is coupled via a wire bond or beryllium spring clip 48a to the sensing pad 41 while the electrically conductive area 4f is coupled via a spring clip 49a to the electrically conductive area 4c. The subsidiary playing piece 400 to be received within the recess 4e has, like the playing piece shown in FIGS. 4 and 5, an electrically conductive casing 400a and contains a data storage device 40a electrically coupled to the casing via a spring clip 49b and to a sensing pad 41a via a wire bond 48b. The subsidiary playing piece 400 is thus the same in structure as the playing piece 4 shown in FIGS. 4 and 5. When the subsidiary playing piece 400 is inserted into the recess 4e, the electrically conductive casing 400a comes into electrical contact with the electrically conductive area 4f' while the sensing pad 41a comes into electrical contact with the electrically conductive area 4g so that, effectively, the data storage device 40a is coupled in parallel with the data storage device 40. The two data storage devices 40 and 40a are arranged to have different response times so that when the playing piece 4 carrying the subsidiary playing piece 400 is held on a sensing area 31 by a player, data is first downloaded from the data storage device 40 and then from the data storage device 40a. The subsidiary playing piece may contain any of the types of data that may be stored by the data storage device 40 in the main playing piece and so may perform any of the functions discussed above with reference to the playing pieces 4. As another possibility, the subsidiary playing piece 400 may not contain its own data storage device but may simply establish an electrical connection which enables the address counter to access areas of the ROM 43 in the main playing piece which could not be accessed absent the presence of the subsidiary playing piece 400.

It will be appreciated that the principle described above with reference to FIG. 17 can be extended to two or more subsidiary playing pieces 400 with appropriate modification of the main playing piece.

In each of the examples described above, power is supplied to a playing piece and data retrieved from a playing piece along a single electrically conductive path.

Figure 18A:
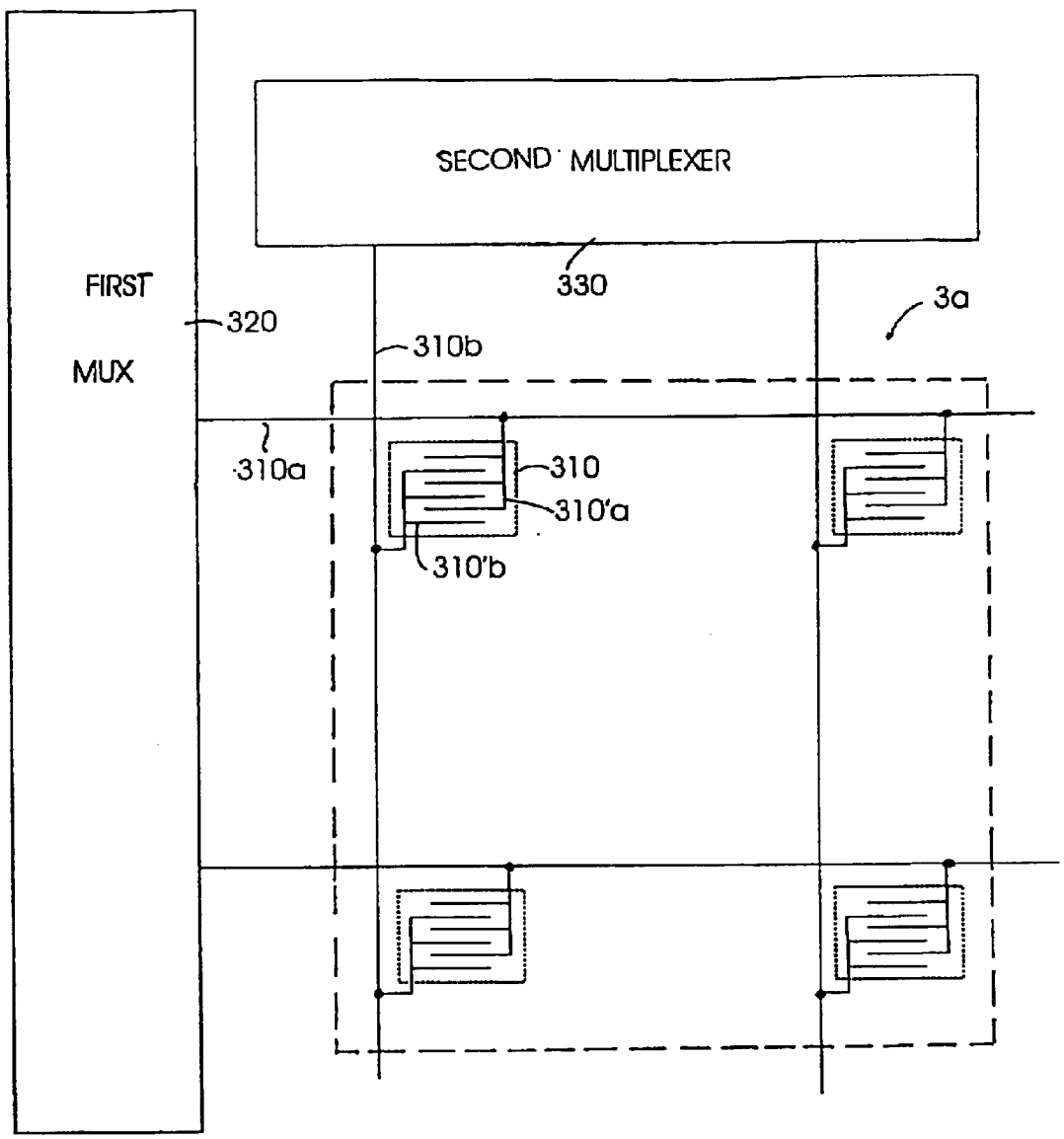
FIG. 18a shows a schematic circuit diagram for illustrating another way of reading playing pieces.

FIG. 18a shows a block schematic electrical diagram of part of a modified form of the playing surface 3a wherein power is supplied to a sensing area 310 via a first conductive track 310a and the signal from a data storage device of a playing piece held on the sensing area 310 is derived via a second conductive track 310b. Each sensing area 310 consists of a first set of fingers 310'a electrically coupled to the corresponding power supply track 310a and a second set of fingers 310b' electrically coupled to the corresponding signal track 310b and interdigitated with the fingers 310'a. The conductive tracks and sensing areas may be formed by conventional screen printing techniques. Although not shown in FIG. 18a, the power conductive tracks 310a and the signal conductive tracks 310b will, of course, be separated by an insulating layer with apertures being formed in the insulating layer at the areas of the sensing devices 310a so as to enable interdigitation of the fingers 310'a and 310'b. In use of the arrangement shown in FIG. 18a, the power conductive tracks 310a may be addressed in sequence using a first multiplexer 320 under the control of the reader microprocessor 259 while the signal lines 310b may similarly be accessed using a second multiplexer 330 under the control of the reader microprocessor 259. As will be appreciated, only the sensing area 310 at the intersection between the power supply conductive track 310a selected by the first multiplexer 320 and the signal conductive track 310b selected by the second multiplexer 330 will be activated at a given time. Accordingly, each of the sensing areas 310 can be accessed in any appropriate order using standard XY addressing techniques.

Figure 18B:
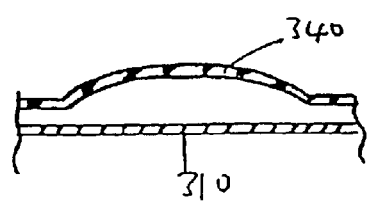
FIG. 18b is a schematic cross-sectional view through a modified form of playing area for a playing surface of apparatus embodying the invention.

As in the embodiment described above with reference to FIGS. 1 and 2, the playing surface 3a will have an electrically insulative top surface 3'a carrying printed matter defining the playing area. The top surface 3'a may be formed of a plastics or rubber material and may, as is known in the calculator keyboard art, for example, be formed with bubbles or protrusions 340 as shown in FIG. 18b over the sensing areas 310 so that a player actually has to press his piece onto the playing area 31 to depress the bubble or protrusion 340 to establish sufficient capacitive coupling between the playing piece and the sensing area to enable power to be derived by the data storage device via the playing area. One of the sets of interdigitated fingers 310'a and 310'b may be carried by the bubble or protrusion 340 so as to reduce the possibility of cross talk.

It will, of course, be appreciated that the arrangement described with reference to FIG. 18b may be used in the embodiment described above with reference to FIG. 1 so that positive pressure by a player is required to depress the protrusion 340 of a playing area before sufficient coupling between the sensing pads 31 and 41 is achieved to enable power to be derived by the data storage device.

In each of the embodiments described above, it has been assumed that the playing surface is two-dimensional. This need, however, not necessarily be the case and the apparatus may be made up of two or more levels which may be coupled capacitively in the same manner as a playing piece is coupled capacitively to the first level. Also, in the arrangements described with reference to FIGS. 1 to 18 structures such as the bridge shown in FIG. 11 or 11a (with or without the data storage device 73) may be used to connect two different game boards or playing surfaces together with one of the game boards or playing surfaces being slaved to the games module of the other. Such a structure may also be used to connect together or extend playing areas on a single playing surface.

The playing surface may also itself be three-dimensional or have topography such as hills or valleys with any variations in the surface resistance due to distortion caused by, for example, vacuum forming to the required three-dimensional shape being accommodated by calibration or by appropriate distribution of the carbon when the sensing surface is formed by printing using a carbon loaded ink.

The present invention may also be used to produce drawing toys for, in particular, small children. For example, the playing pieces may be made to represent different colour pencils and when the child follows a track of sensing areas (which may have the additional location arrangement discussed with reference to FIG. 15), the games microprocessor may cause the display to display a track of the same colour as the playing piece and emulating the path followed by the child with the playing piece. As another possibility, the playing pieces may be representations of animals or objects and the games microprocessor may cause the display 5 to display a picture of the relevant animal when the child places the playing piece on a sensing area. In the above-described examples, the playing pieces generally have three-dimensional surface typography. It will, however, be appreciated that the playing pieces may be flat or planar tiles, cards or the like.

The present invention may also be applied to dolls or like toy figures so that, for example, when the child lifts the doll or contacts certain parts of the doll an audible message issues from a loudspeaker integral with the doll. In such a case, the games module 2 would normally be provided by or within the doll or toy figure and the playing pieces may be incorporated in, carried by or insertable into the doll or toy figure. The present invention may also be applied to toys that can be built up from a number of components or construction kits with, for example, the functions that the toy or construction can carry out when touched by a child being determined by the particular components which have been assembled. In this case, the games module will be provided by or within one of the components and the playing pieces may be provided by, incorporated in or insertable into others of the components.

It will be appreciated that the functions of the games and reader microprocessors may be carried out by a single microprocessor or microcontroller. However having separate games and reader microprocessors has advantages. For example, it may enable the part of the apparatus containing the games microprocessor to be separate from the part containing the reader microprocessor and, for example, the game microprocessor and its accompanying peripherals could be a conventional personal computer or computer games machine with appropriate software.

In the examples described above, any data downloaded from a playing piece is in digital form and requires further processing. However, where the playing piece stores, for example, audio data the playing piece may itself incorporate appropriate processing means such as a digital-to-analogue converter or may have an analogue memory so that the audio data is downloaded in analogue form and may be used to drive a loudspeaker via an appropriate interface, for example. Such a playing piece would be particularly useful for toys for small children such as that shown in FIG. 12. This would increase the overall cost of the playing piece but reduce the cost of the games module because the processing components described above would not be required. Indeed because the downloaded data would be in analogue form, the multiplexing arrangement could also be omitted even where there were multiple playing areas and pieces because the analogue signal provided by different playing pieces could simply be combined so that the sounds for the different playing pieces are combined as would occur naturally if two or more people or animals made sounds at the same time.

In the majority of the examples described above, the microprocessor 26 retrieves data from the playing pieces or components. As discussed above, this data may simply identify the piece and tell the microprocessor where to find in its memory information relevant to that piece (for example audio or video information to be presented to the user of the apparatus or features or characteristics of the piece) or the data may itself be stored in the piece. In the latter case, the playing pieces may as discussed above also incorporate software for modifying or upgrading the game being played so allowing a user to modify or completely change the game by buying new playing pieces.

The memory carried by the data storage device may be electrically programmable enabling the games module to, for example, modify the data stored in playing pieces with, for example, the addition of new pieces to the game. Thus, for example, data from a new playing piece altering the characteristics of other pieces in the game may either simply be stored in the memory of the games module or may be transferred to the playing piece itself so as to permanently change the characteristics of that playing piece. Where the memory is electronically programmable then it may be programmable by a user using conventional means so enabling, for example, a player to store his own message or game play changes. Also, the games microprocessor may store a playing piece's status or position in the game in that playing piece's data storage device so that the playing piece returns to its status or position in the next game which may be played with the same or another identical gaming apparatus.

For ease and simplicity of manufacture the serial ROMS for all playing pieces originally provided with the game may contain data relevant to all of the different playing pieces and the passive data storage devices may be individualised to the respective playing pieces either by tailoring the conductive tracks on the data storage device or by using wire bonding so that each playing piece is only able to access the addresses of the ROM relevant for that playing piece.

It will be appreciated from the above that the inclusion of additional impedance in the earth loop will not make any significant difference to the operation of the apparatus because the apparatus does not rely on the use of tuned resonant circuits which require a low resistance to achieve a high Q. This enables, as discussed above, the sensing pads 31 and associated conductive tracks to be formed as relatively high resistance printed conductive ink pads and tracks rather than metal pads and tracks and also allows the electrically conductive body of the playing piece to be formed of an electrically conductive plastics material rather than metal.

The supply of data from the data storage device 40 to the games module is in the above examples carried out synchronously with respect to the carrier signal supplied by the oscillator 250 because the data storage device 40 clock is derived from the signal provided by the oscillator 250 under the control of the reader microprocessor 259. However the data storage device 40 may be provided with a free-running clock oscillator instead of the generator 45 so that data transmission is carried out asynchronously. In such a case, the carrier gating circuit shown in FIG. 3 will not be required to gate the carrier signal but may be retained to enable the reader to control the reset switch 44a to reset a playing piece's counter 44. Synchronous transmission of the data however has advantages in that it gives the reader 25 control over the data transmission rate so enabling high rate, reliable transmission of the data and it also avoids the need for a free-running clock oscillator on the data storage device 40, so reducing the power requirements of the data storage device.

Where a game involves only one playing piece or only a small number of playing pieces, then the microprocessor may operate on an interrupt basis and the multiplexer may be omitted.

In the above examples, the data is transmitted using amplitude modulation. However, phase (as described in WO97/23060) or other suitable modulation may be used to transmit the data.

The present invention may also be used to program the movement of toy vehicles. For example, a set of toy vehicles each provided with its own passive data storage device could be provided along with a board defining a number of different shape conductive tracks. In order to use this toy, the child moves the vehicle along the conductive track causing it to come into contact with a succession of sensing pads. This information is acquired by the games microprocessor 26 as described above and converted into control signals for controlling a motor and steering of the toy vehicle either directly via a wire link or remotely via a radio link, so that the toy vehicle is effectively programmed and will follow a path defined by the conductive track along which it was previously moved. A similar principle could be used to move pieces, for example chess pieces, round a board with the signal supplied by the games microprocessor being determined by the rules of the game. In such cases it is of course necessary for the playing pieces to have their own power supply for powering their drive motor.

In the above described examples, the coupling between the sensing pads of the game board and the playing pieces 31 and 41 is capacitive. However, where the sensing pads can be provided on the top of the playing surface, ohmic connection between the sensing pads 31 and 41 may be used. This would enable even smaller areas of contact between the playing pieces and the game board.

Apparatus embodying the invention enables the game board to be provided as a low cost cardboard or plastics mat with, as discussed above, the sensing pads and associated conductive tracks being printed onto the underneath surface of a top printed layer of the mat. Such a mat may be flexible allowing it to be rolled up for storage, for example. Also, the individual playing pieces can be low cost and can have built in intelligence and data. Furthermore, the playing surface may have a large number of playing areas each associated with a respective sensing pad. For example where each sensing pad 31 has only one conductive track associated therewith, up to one hundred or more playing areas may be provided on a board without problems of interference between playing areas.

Game play and game play updates can, as discussed above, be stored in the playing pieces enabling a child to upgrade an existing game or toy simply by purchasing a new playing piece. Also, playing pieces are only active or "in play" when touched or contacted by a player.

The present invention may also be applied to educational games structures such as, for example, globes representing the earth or other bodies with, in this case, each sensing area being located at a specific geographical location such that when a user brings a playing piece in the form of a wand or pointing device or the like into contact with a sensing area, information regarding that geographic location is presented to the user by the games microprocessor from information stored in its memory or in the wand or pointing device. For example, the microprocessor may cause an audible message to be presented to the user via a loudspeaker giving information about that particular geographic location.

The present invention may also be applied to gaming tables and the like.

It should be appreciated that the arrangement described with reference to FIG. 16 where the data communicated from the playing piece depends upon where the user touches the playing piece may be applied to an arrangement where the contact with a user is effected by the user operating a switch (which may be electrical (ohmic or capacitive for example) mechanical or optical for example) rather than a capacitive coupling through the user. Such an arrangement would however in the case of the apparatus shown in FIG. 1 require two conductive tracks to each playing area with the attendant disadvantages as discussed above and would be more expensive and complex to manufacture because of the need to provide switches and the like.

An aspect of the invention provides a playing piece, toy, figurine or component, comprising: a memory storing data; means for deriving a power supply to enable data to be read from the memory only in response to the playing piece being ohmically or capacitively coupled with a player; and means for supplying data from the memory when a power supply is derived by the deriving means.

An aspect of the invention provides a playing piece, toy, figurine or component, comprising: a memory storing data; means for deriving a power supply to enable data to be read from the memory only in response to the playing piece being touched by a player; and means for supplying data from the memory when a power supply is derived by the deriving means.

An aspect of the invention provides a playing piece, toy, figurine or component, comprising: a memory storing a plurality of sets of data; means for reading a set of data from the memory data with the set of data read by the reading means being dependent upon where a user touches the playing piece, toy, figurine or component.

An aspect of the invention provides a playing piece, toy, figurine or component having first and second electrically conductive surfaces adapted to be capacitively coupled to playing areas of a playing surface; a memory storing data; means for deriving a power supply from a power supply unit by means of the capacitive coupling of the first and second electrically conductive surfaces to respective different playing areas of the playing surface; and means for supplying data from the memory when a power supply is derived by the deriving means.

An aspect of the invention provides gaming apparatus comprising: means for sensing the presence of a playing piece on a playing area; means for monitoring the time for which a playing piece has been held by a player; and means for determining the future progress of the playing piece in accordance with the monitored time.

An aspect of the invention provides gaming apparatus comprising: means for sensing the presence of a playing piece on any one of a plurality of playing areas; means for determining the speed and/or accuracy of movement of a playing piece, for example the speed and/or accuracy of movement between playing areas, in accordance with information provided by the sensing means; and means for determining the future progress of the playing piece in accordance with the determined speed and/or accuracy.

An aspect of the invention provides gaming apparatus comprising: means for sensing the presence of a playing piece on a playing area, and means for determining the future progress of the playing piece in accordance with at least one of: the status of that playing piece; its location; where the piece is touched by a player; its relationship relative to other playing pieces.

An aspect of the intention provides a gaming apparatus comprising means for sensing the presence of a playing piece on a playing area; and means for modifying or changing the rules of a game in accordance with the sensed playing piece.

An aspect of the invention provides gaming apparatus comprising means for sensing the presence of playing pieces on a playing area or areas; and means for modifying or changing the rules of a game in accordance with the sensed playing pieces and/or the playing area or areas on which the pieces are sensed.

An aspect of the invention provides a playing piece for use in games apparatus having memory means storing data for modifying or changing at least one of the rules or date relating to a game to be played using the playing piece.

An aspect of the invention provides a playing piece for use in games apparatus having means for receiving a further playing piece and means for allowing data to be supplied from a memory of that further playing piece when power is derived by the playing piece.

An aspect of the invention provides a playing piece or component having means for receiving a further playing piece and means for allowing data related to that further playing piece to be communicated only when the further playing piece is received by said receiving means.

An aspect of the invention provides a playing piece having a plurality of areas that may be touched by a user and means for supplying different data in accordance with the area touched by the user.

An aspect of the invention provides gaming apparatus comprising at least one playing surface having one or more playing areas; means for sensing a component on a playing area; and at least one component adapted to couple together playing areas or to extend a playing area. The component may be adapted to couple together playing areas on different playing surfaces. The component may comprise first and second electrically conductive surfaces adapted to be capacitively coupled to respective playing area; and means for enabling data communication between the games modules.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

Other modifications will be apparent to those skilled in the art.

What is claimed is:

1. Game apparatus comprising a game module and at least one playing piece separate from the game module, the game module having a playing surface with at least one playing area, the at least one playing area having first electrical coupling means, the at least one playing piece having second electrical coupling means for coupling with the first electrical coupling means, the game module having means for supplying a signal to a playing piece electrically coupled to the game module, and the playing piece having a memory means for storing data, means for deriving a power supply from the signal supplied by the game module, the power supply deriving means comprising coupling means for coupling to a user so as to complete an electrical path from the game module via the user back to the game module, and means for communicating data between the playing piece and the game module in response to power being derived by the power deriving means from the signal provided by the game module.

2. Game apparatus according to claim 1, wherein said coupling means is arranged to couple to a user so as to complete an electrical path from the game module via the user back to the game module when the user makes contact with or is in close proximity to the playing piece.

3. Game apparatus according to claim 1, wherein the first and second electrical coupling means are arranged so as to couple capacitively to one another or to make a direct ohmic connection.

4. Game apparatus according to claim 1, wherein the communication means is arranged to communicate data from said playing piece to said game module by modulating a signal supplied by the game module.

5. Game apparatus according to claim 4, wherein said modulating is amplitude modulating.

6. Game apparatus according to claim 1, wherein the playing piece carries data for identifying the playing piece to the game module and the communication means is arranged to communicate said identifying data to the game module.

7. Game apparatus according to claim 1, wherein at least one of the game module and playing piece is associated with a loudspeaker, at least one of the playing piece and game module stores audio data and means are provided for driving the loudspeaker in accordance with said audio data.

8. Game apparatus according to claim 1, wherein at least one of the game module and playing piece is associated with a display, at least one of the game module and playing piece stores display data and means are provided for driving the display in accordance with said display data.

9. Game apparatus according to claim 1, wherein the game module has a plurality of first electrical coupling means electrically separated from one another and means for determining when the second electrical coupling means of a playing piece is electrically coupled to a particular one of said first electrical coupling means.

10. Game apparatus according to claim 1, wherein said first electrical coupling means is provided beneath an upper layer of the playing surface so that the first and second electrical coupling means are capacitively coupled when a player places the playing piece on the playing surface.

11. Game apparatus according to claim 1, wherein the game module has a plurality of playing areas each having a respective different first electrical coupling means and the game module comprises means for determining the location on the playing surface of a playing piece in response to the playing piece being placed on a playing area.

12. Game apparatus according to claim 11, wherein the game module comprises means for checking the first electrical coupling means of each playing area one after another to determine whether a second electrical coupling means of a playing piece is electrically coupled thereto.

13. Game apparatus according to claim 12, further comprising multiplexing means for coupling each of the first electrical coupling means to the checking means.

14. Game apparatus according to claim 1, wherein a plurality of playing pieces are provided and each playing piece carries data for enabling the game module to distinguish that playing piece from the other playing pieces.

15. Game apparatus according to claim 1, wherein the game module has a memory storing instructions and the at least one playing piece carries data for modifying the instructions stored in the memory.

16. Game apparatus according to claim 1, further comprising means for connecting the game module to a game module of another gaming apparatus.

17. Game apparatus according to claim 16, wherein the connecting means comprises a component having means for coupling between the playing surface of the game modules.

18. Game apparatus according to claim 1, wherein the game module has an additional playing area spaced from the playing area and arranged such that the user completes the electrical path by contacting both the playing area and the additional playing area.

19. Game apparatus according to claim 1, wherein the electrical path from the user back to the game module is completed by a ground return path.

20. Game apparatus comprising a game module and at least one playing piece separate from the game module, the game module having first electrical coupling means, the at least one playing piece having second electrical coupling means for coupling with the first electrical coupling means, the game module having means for generating a signal for supply to a playing piece when the playing piece is electrically coupled to the game module, and the playing piece having means for deriving a power supply from the signal supplied by the game module, the power supply deriving means comprising coupling means for coupling to a user so as to complete an electrical path from the game module via the user back to the game module, and communication means for communicating data to at least one of the user and the game module in response to power being derived by the power deriving means from the signal provided by the game module.

21. Game apparatus according to claim 20, wherein the playing piece has a memory and the communication means is arranged to communicate data between the memory and the game module.

22. A playing piece for use with a separate game module having a playing surface with at least one playing area having first electrical coupling means and having means for supplying a signal to a playing piece electrically coupled to the game module, the playing piece having second electrical coupling means for coupling with the first electrical coupling means, a memory means for storing data, means for deriving a power supply from the signal supplied by the game module, the power supply deriving means comprising coupling means for coupling to a user so as to complete an electrical path from the game module via the user back to the game module, and means for communicating data between the playing piece and the game module in response to power being derived by the power supply deriving means from the signal provided by the game module.

23. A playing piece according to claim 22, wherein the playing piece carries a number of different second electrical coupling means and the communication means is arranged to communicate different data dependant upon which one of the different second electrical coupling means is coupled with the user.

24. A playing piece for use in a game apparatus, the playing piece comprising:

memory means storing a plurality of sets of data;

electrical coupling means for coupling with electrical coupling means of a game module that is separate from the playing piece;

means for deriving a power supply from a signal supplied by supplying means of the game module in response to a user touching the playing piece; and means for communicating a particular one of the plurality of sets of data with a user or game module in response to power being derived by the power supply deriving means from the signal provided by the game module, wherein the particular set of data that is communicated is dependent upon where the user touches the playing piece.

25. A game module comprising: a playing surface with at least one playing area having first electrical coupling means for receiving a separate playing piece having second electrical coupling means, a memory means for storing data and means for deriving a power supply having coupling means for coupling to a user, the game module having means for supplying a signal to the separate playing piece when the first and second electrical coupling means are electrically coupled so that an electrical path from the game module back to the game module is completed via the user, and means for communicating data between the separate playing piece and the game module in response to power being derived by the power supply deriving means from the signal provided by the game module.

26. A game module according to claim 25, comprising means for identifying a playing piece from data stored in a memory of the playing piece.

27. Game apparatus according to claim 25, further comprising means for connecting the game module to a game module of another gaming apparatus.

28. Game apparatus according to claim 27, wherein the connecting means comprises a component having means for coupling between the playing surfaces of the game modules.

29. Game apparatus comprising:

a game module having a playing surface defining at least one playing area having first electrical coupling means;

at least one playing piece separate from the game module and adapted to be placed on the at least one playing area, the at least one playing piece having second electrical coupling means for coupling with the first electrical coupling means when the playing piece is placed on the playing area;

processing means for carrying out instructions relating to a game to be played;

first memory means for storing data relevant to a game;

signal supplying means for supplying a signal to a playing piece when the playing piece is placed on the at least one playing area so that the first and second electrical coupling means are electrically coupled, the at least one playing piece having means for deriving a power supply from the signal supplied by the signal supplying means, the power supply deriving means comprising coupling means for coupling to a player so as to complete an electrical path from the game module back to the game module when the player places the playing piece on the playing area thereby supplying power to the playing piece; and communication means for communicating data between the playing piece and the processing means in response to the player placing the playing piece on the playing area so that power is derived by the power supply deriving means from the signal provided by the game module.

30. Game apparatus comprising:

a playing surface defining at least one playing area;

processing means for carrying out instructions relating to a game to be played;

at least one playing piece or component separate from the playing surface and adapted to be placed on the at least one playing area, the at least one playing piece comprising:

memory means storing a plurality of sets of data;

electrical coupling means for coupling with electrical coupling means of a game module;

means for deriving a power supply from a signal supplied by supplying means of the game module in response to a user touching the playing piece; and means for communicating a particular one of the plurality of sets of data with a user or game module in response to power being derived by the power deriving means from the signal provided by the game module, wherein the particular set of data that is communicated is dependent upon where the user touches the playing piece.

31. Game apparatus comprising:
a game module having a playing surface with at least one playing area, the at least one playing area having a first electrical coupler; and
at least one playing piece separate from the game module and having a second electrical coupler operable to couple with the first electrical coupler,
the game module having a supplier operable to supply a signal to a playing piece electrically coupled to the game module, and the at least one playing piece having a memory operable to store data, a deriver operable to derive a power supply from the signal supplied by the game module, the deriver comprising a coupler operable to couple to a user so as to complete an electrical path from the game module via the user back to the game module, and a communicator operable to communicate data between the playing piece and the game module in response to power being derived by the deriver from the signal provided by the game module.

32. Game apparatus comprising: a game module having a first electrical coupler and at least one playing piece separate from the game module and having a second electrical coupler operable to couple with the first electrical coupler,
the game module having a signal generator operable to generate a signal for supply to a playing piece when the at least one playing piece is electrically coupled to the game module, and
the at least one playing piece having a deriver operable to derive a power supply from the signal supplied by the game module, the deriver comprising a coupler operable to couple to a user so as to complete an electrical path from the game module via the user back to the game module, and a communicator operable to communicate data to at least one of a user and the game module in response to power being derived by the deriver from the signal provided by the game module.

33. A playing piece for use with a separate game module having a playing surface with at least one playing area having a first electrical coupler and having a supplier operable to supply a signal to a playing piece electrically coupled to the game module, the playing piece having a second electrical coupler operable to couple with the first electrical coupler, a memory operable to store data, a deriver operable to derive a power supply from the signal supplied by the game module, the deriver comprising a coupler operable to couple to a user so as to complete an electrical path from the game module via the user back to the game module, and a communicator operable to communicate data between the playing piece and the game module in response to power being derived by the power deriving means from the signal provided by the game module.

34. Game apparatus comprising: a game module and at least one playing piece separate from the game module,
the game module having means for supplying a signal to the at least one separate playing piece; and
the at least one separate playing piece having power supply deriving means for deriving a power supply from the signal supplied by the game module, the power supply deriving means including coupling means for coupling the at least one playing piece to a user so as to complete an electrical path in order for the playing piece and the game module to communicate with one another.

35. Game apparatus comprising a game module and at least one playing piece, the game module having a playing surface with at least one playing area, the at least one playing area having a first electrical coupler, the at least one playing piece having a second electrical coupler operable to couple with the first electrical coupler, the game module having a signal supplier operable to supply a signal to a playing piece electrically coupled to the game module, and the at least one playing piece having
a memory storing data,
a power supply deriver operable to derive a power supply from the signal supplied by the game module, the power supply deriver comprising a coupler operable to couple to a user so that the game module, playing piece and user are coupled in series and the user is coupled back to the game module, thereby completing a series electrical path from the game module via the user back to the game module, and
a communicator operable to communicate data between the playing piece and the game module in response to power being derived by the power deriver from the signal provided by the game module.

36. Game apparatus comprising:
a game module having a playing surface with a plurality of playing areas each having a first electrical coupler and a signal supplier operable to supply a signal to the first electrical couplers; and
at least one playing piece movable over the playing surface so as to enable the playing piece to be positioned on different ones of the plurality of playing areas,
the at least one playing piece having
a second electrical coupler operable to couple with the first electrical coupler of the playing area on which the playing piece is positioned so as to couple the signal supplied by the signal supplier to the second electrical coupler,
a memory storing data,
a power supply deriver operable to derive a power supply from the signal coupled to the second electrical coupler, the power supply deriver comprising a coupler operable to couple to a user to complete an electrical path from the game module via the playing piece to the user and from the user back to the game module, and
a communicator operable to communicate data from the playing piece to the game module in response to power being derived by the power deriver from the signal provided by the game module,
the game module further having
a memory storing game data and game rules for at least one game,
a processor operable to implement the game rules for the at least one game,
a user interface operable to communicate with a user in accordance with the game rules implemented by the processor to enable the user to play the at least one game,
a determiner operable to determine the playing area on which the playing piece is positioned, and
a game controller operable to modify, change or upgrade at least one of the game rules and game data on the basis of data communicated from the playing piece and in dependence upon the determined playing area.

37. Game apparatus comprising:
a game module having a first electrical coupler; and
at least one playing piece separate from the game module and having a second electrical coupler operable to couple with the first electrical coupler, the game module having a signal supplier operable to supply a signal to a playing piece when the playing piece is electrically coupled to the game module, and the playing piece having a power supply deriver operable to derive a power supply from a signal supplied by signal supplier of the game module when the playing piece is electrically coupled to the game module, the power supply deriver comprising a coupler operable to couple to a user or other body so as to complete an electrical circuit from the game module via the playing piece to the user or other body and thence from the user back to the game module when the user or other body is in contact with or in close proximity to the playing piece and the playing piece is electrically coupled to the game module, thereby enabling the power supply deriver to derive a power supply from the signal supplied by the signal supplier of the game module, and a communicator operable to communicate date in response to power being derived by the power deriving means from the signal provided by the game module.

* * * * *

UNITED STATES PATENT AND TRADEMARK OFFICE
CERTIFICATE OF CORRECTION

PATENT NO. : 6,835,131 B1
DATED : December 28, 2004
INVENTOR(S) : Andrew David White et al.

It is certified that error appears in the above-identified patent and that said Letters Patent is hereby corrected as shown below:

<u>Title page,</u>
Item [57], ABSTRACT,
Line 3, "games" should read -- game --.

<u>Column 24,</u>
Line 59, "surface" should read -- surfaces --.

<u>Column 30,</u>
Line 7, "date" should read -- data --.

Signed and Sealed this

Fifth Day of April, 2005

JON W. DUDAS
*Director of the United States Patent and Trademark Office*